United States Patent

Marsh et al.

[11] Patent Number: 5,930,831
[45] Date of Patent: Jul. 27, 1999

[54] PARTITION MANIPULATION ARCHITECTURE SUPPORTING MULTIPLE FILE SYSTEMS

[75] Inventors: Russell J. Marsh, Lindon; Robert S. Raymond; J. Scot Llewelyn, both of Orem; Niel Orcutt, Pleasant Grove, all of Utah

[73] Assignee: PowerQuest Corporation, Orem, Utah

[21] Appl. No.: 08/834,004

[22] Filed: Apr. 11, 1997

Related U.S. Application Data

[63] Continuation-in-part of application No. 08/393,805, Feb. 23, 1995, Pat. No. 5,675,769, and application No. 08/554,828, Nov. 7, 1995
[60] Provisional application No. 60/026,585, Sep. 19, 1996.
[51] Int. Cl.⁶ .................................................. G06F 12/02
[52] U.S. Cl. ........................................ 711/173; 711/112
[58] Field of Search .................................. 711/112, 165, 711/170, 171, 172, 173

[56] References Cited

U.S. PATENT DOCUMENTS

| | | | |
|---|---|---|---|
| 4,722,048 | 1/1988 | Hirsch et al. | 395/672 |
| 4,819,159 | 4/1989 | Shipley et al. | 395/182.17 |
| 4,982,324 | 1/1991 | McConaughy et al. | 395/200.52 |
| 4,994,963 | 2/1991 | Rorden et al. | 395/309 |
| 5,062,042 | 10/1991 | Binkley et al. | 707/205 |
| 5,136,711 | 8/1992 | Hugard et al. | 395/652 |
| 5,166,936 | 11/1992 | Ewert et al. | 371/21.6 |
| 5,214,695 | 5/1993 | Arnold et al. | 380/4 |
| 5,269,018 | 12/1993 | Lee | 395/185.01 |
| 5,291,585 | 3/1994 | Sato et al. | 395/500 |
| 5,307,497 | 4/1994 | Feigenbaum et al. | 395/651 |
| 5,313,646 | 5/1994 | Hendricks et al. | 707/101 |
| 5,359,725 | 10/1994 | Garcia et al. | 707/200 |
| 5,361,358 | 11/1994 | Cox et al. | 395/712 |
| 5,363,487 | 11/1994 | Willman et al. | 242/608.8 |
| 5,371,885 | 12/1994 | Letwin | 707/205 |
| 5,438,671 | 8/1995 | Miles | 395/200 |
| 5,457,778 | 10/1995 | Sieffert | 345/501 |
| 5,469,571 | 11/1995 | Bunnell | 395/673 |
| 5,502,839 | 3/1996 | Kolnick | 395/500 |
| 5,528,261 | 6/1996 | Holt et al. | 345/150 |
| 5,537,592 | 7/1996 | King et al. | 707/200 |
| 5,574,903 | 11/1996 | Szymanski et al. | 707/1 |
| 5,577,186 | 11/1996 | Mann, II et al. | 345/302 |

OTHER PUBLICATIONS

"NTFS System Files", Microsoft Corporation (1995), PSS ID No.: Q103657, Mar. 7, 1995.

Norton Utilities® for Windows® 95 User's Guide, Symantec Corporation (1995), pp. 2–31, 2–32.

"Additional Information About Chkdsk", Windows NT Workstation, Microsoft Corporation (1997), no later than Jul. 1, 1997.

Central Point PC TOOLS for Windows, Central Point Software, Inc.® (1993), pp. 553–555.

M. Russinovich, "Inside Windows NT Disk Defragmentation", Mar. 6, 1997.

OS/2 2.0 Technical Library, Programming Guide vol. I, International Business Machines Corporation (1992), pp. 2–2, 2–3.

(List continued on next page.)

*Primary Examiner*—Eddie P. Chan
*Assistant Examiner*—Kevin L. Ellis
*Attorney, Agent, or Firm*—Computer Law++

[57] ABSTRACT

Methods and systems are provided for implementing partition manipulation tools. One embodiment of a partition manipulation computer system implements an architecture that supports multiple file systems on a computer. The computer system includes a data replicator for replicating data from a selected partition to a modified partition in a partitionable storage medium. The data replicator has an initialization interface for interfacing to initialization modules in a format that is substantially independent of each file system used on the computer system. The initialization modules, which may be specific to one or more file systems, generate sector identifications. A verification interface and a completion interface are also provided, for interfacing with file-system-specific verification and completion modules.

46 Claims, 7 Drawing Sheets

OTHER PUBLICATIONS

Chris Yates, "Taking the tedium out of installs", PC Week Online, Nov. 6, 1996.

"About Ghost Software", Binary Research Limited, no later than Jul. 2, 1997.

Mark Scanlon, "Re: Microsoft & Ghost", E–Mail, Jun. 6, 1997.

Doug Good, "Plastic Surgery for Ghost required", E–Mail, Jun. 23, 1997.

Ghost Manual, date unknown, Introduction and Overview.

"What is the Microsoft Windows NT Installable File System (IFS) Kit and where can I get it?", Microsoft Windows NT Questions and Answers, Microsoft Corporation (1997), no later than Jul. 2, 1997.

"WFWG 3.11 Does Not Pass Requests to Novell DOSN-P.EXE", Microsoft Knowledge Base, Microsoft Corporation (1997), Article ID: Q119106, Nov. 21, 1994.

"Err Msg: 'Cannot Find FSHELPER File'", Microsoft Knowledge Base, Microsoft Corporation (1997), Article ID: Q49558, Sep. 30, 1994.

Automated Client Upgrade Process, Microsoft Corporation (1989–1997), pp. 1–64.

Internet comp.archives.medos.announce posting with subject "preszlll.zip—The Partition Resizer: Safe HD repartitioning", Apr. 29, 1995.

"One CD to fit them all", Barry Fox, *Technology*, Dec. 1994, p. 19.

PRESZ111.ZIP (Partition Resizer program submitted in *.zip form on 3.5 inch DOS disk labeled "IDS Disk One"), unknown version apparently released at least as early as Nov. 1994.

FIPS12.ZIP (FIPS program submitted in *.zip form on 3.5 inch DOS disk labeled "IDS Disk One"), alpha version 0.1 released Apr. 12, 1993, version 1.0 released May 3, 1994, version 1.2 released Oct. 20, 1994.

"Unconstrained Filenames on the PC! Introducing Chicago's Protected Mode Fat File System", Walter Oney, *Microsoft Systems Journal*, Aug. 1994, pp. 13–24.

"File–System Development with Stackable Layers", John S. Heidemann et al., *ACM Transactions of Computer Systems*, vol. 12, No. 1, Feb. 1994, pp. 58–89.

"A High Performance and Reliable Distributed File Facility", Rajmohan Panadiwal et al., Proc. 14th IEEE International Conference on Distributed Computer Systems, 1994, pp. 116–123.

Disk Administrator (screen shot), Windows NT version 3.5 (date unknown), prerelease version dated Jun. 26, 1992, version 3.1 release dated Sep. 11, 1993.

"A Subsystem for Swapping and Mapped File I/O on Top of CHORUS", Lothar Borrmann et al., Proc. 13th IEEE International Conference on Distributed Computer Systems, 1993, pp. 12–19.

"Extending Device Management In Minix", C. Kavka et al., ACM SIGOPS Operating System Review, Apr. 1993, vol. 27, No. 2, pp. 35–43.

"The Logical Disk: A New Approach to Improving File Systems", Wiebren de Jonge et al., 14th ACM Symposium on Operating Systems Principles, 1993, pp. 15–28.

"An MS–DOS File System for UNIX", Alessandro Forin et al. Sep. 1993, pp. 1–23.

"Open Boot Firmware", Mitch Bradley, *USENIX*, Winter 1992, pp. 223–235.

"Loge: a self–organizing disk controller", Robert M. English et al., *USENIX*, Winter 1992, pp. 237–251.

"Go Anywhere and Do Anything with 32–bit Virtual Device Drivers for Windows™", Andrew Schulman, *Microsoft systems Journal*, Oct. 1992, pp. 15–25.

"Semantic File Systems", David K. Gifford et al., 13th ACM Symposium on Operating Systems Principles, 1991, pp. 16–25.

"Port Windows™ Applications to OS/2 (Almost) Painlessly with the Software Migration Kit", Eric Fogelin et al., *Microsoft Systems Journal*, Nov. 1990, pp. 21–30.

"Design Goals and Implementation of the New High Performance File System", Ray Duncan, *Microsoft Systems Journal*, Sep. 1989, pp. 01–13.

"Vnodes: An Architecture for Multiple File System Types in Sun UNIX", S.R. Kleiman, Summer 1986 USENIX Conference, pp. 238–247.

"The Generic File System", R. Rodriguez et al., Summer 1986 USENIX Conference, pp. 260–269.

"Chapter 8—File System and Network Redirector", Andrew Schulman et al., *Undocumented DOS: A Proqrammer's Guide to Reserved MS–DOS® Functions and Data Structures*, Second Edition, 1994, p. 413.

"MS–DOS Disk Internals Chapter 8", Ray Duncan, *Advanced MSDOS®, The Microsoft Guide for Assembly Language and C Programmers*, 1986, pp. 161–173.

"FormatterFive™, Partitioning and File Transfer Utility for Macintosh®", product information sheet, 1990–1994, Software Architects Inc., Bothell, Washington.

"MultiBus Manager™, Multiple SCSI Bus Manager for the Macintosh®", product information sheet, 1994, Software Architects Inc., Bothell, Washington.

"Formatter5™ Pro", product information sheet, 1993, Software Architects Inc., Bothell, Washington.

"FormatterOne™ Pro, SCSI Manager 4.3 Driver & Utility for the Macintosh®", product information sheet; 1993, Software Architects Inc., Bothell, Washington.

"Lido 7™", product information sheet, Sep. 27, 1993, Surf City Software, Orange, California.

"MultiDisk disk partitioner", product information sheet, AlSoft Poer Utilities™, Spring, Texas.

"MultiDisk™ Disk Partitioning", product information sheet.

"GFS Revisited or How I Lived with Four Different Local File Systems", Matt Koehler, pp. 291–305.

PRESIZER.DOC (printout from PRESZ111.ZIP).

README.1ST (printout from PRESZ111.ZIP).

"Multidisk (Software Reviews) (ALSoft Inc.'s Utility Program)", James Finn, *MacUser*, vol. 5, No. 5, May 1989, p. 68.

"Disk Administrator—Convert Info", Windows NT version 3.5 (date unknown), prerelease version dated Jun. 26, 1992, version 3.1 release dated Sep. 11, 1993.

John Lagonikas, "Partition Resizer v. 1.1.1 Program's Manual and Technical Information", Zeleps (1994–95).

Arno Schaefer, "Welcome to FIPS Version 1.1.1", Oct. 13, 1994.

Alsoft® Power Utilities™, ALSoft, Inc. (1989–94).

Maria Tyne, Thinking Person's Guide to OS/2 2.1, John Wiley & Sons, Inc. (1993), pp. 193–195.

Additional Information regarding Doug Azaritto, in Information Disclosure Statement dated May 23, 1995 to 08/393, 805.

Quarterdeck Initial Disclosure under Rule 26, Nov. 5, 1998.

Quarterdeck Supplemental Initial Disclosure under Rule 26, Nov. 20, 1998.

PARTITION MANIPULATION ARCHITECTURE SUPPORTING MULTIPLE FILE SYSTEMS

RELATED APPLICATIONS

The present application is a continuation-in-part of commonly owned U.S. patent application Ser. No. 08/393,805, U.S. Pat. No. 5,675,769 filed Feb. 23, 1995, Ser. No. 08/554,828, filed Nov. 7, 1995 and Ser. No. 60/026,585, filed Sep. 19, 1996 (collectively "the parent applications").

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

The present invention relates to replication of data stored according to a file system format in a computer disk partition, and more particularly to a partition manipulation architecture that supports different file systems by providing interfaces between a file-system-independent replicator and one or more file-system-dependent modules.

TECHNICAL BACKGROUND OF THE INVENTION

The Technical Backgrounds of the parent applications are incorporated herein by reference. For convenience, portions of the parent applications are also reproduced below.

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular.

FIG. 1 illustrates a disk 10 attached to a disk drive 12. The disk 10 illustrates physical characteristics of both floppies and hard disks; cubical disks or other disks may appear in different configurations than the one shown here. The disk 10 contains a number of concentric data cylinders such as the cylinder 14. The cylinder 14 contains several data sectors, including sectors 16 and 18. The sectors 16 and 18 are located on an upper side 20 of the disk 10; additional sectors may be located on a lower side 22 of the disk 10. The sides 20, 22 of the disk 10 define a platter 24. A hard disk may contain several platters. The upper side 20 of the disk 10 is accessed by a head 26 mounted on an arm 28 secured to the drive 12. Optical or cubical disks may be accessed by other means, such as photoemitters or photoreceptors.

A given sector on the disk 10 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

Many disks mold the available space into one or more partitions by using a partition table located on the disk. A wide variety of partitions are used, and more partition types will no doubt be defined over time. A partial list of current partitions and their associated file systems is given below; the trademarks listed are the property of their respective owners. This list illustrates the benefit of being able to manipulate a variety of partitions; it does not follow that each and every partition listed should or must be supported in a commercial product or in an embodiment of the invention described and claimed hereafter:

12-bit FAT
16-bit FAT>=32 MB, Ext INT 13
16-bit FAT, partition<32 MB
16-bit FAT, partition>=32 MB
32-bit FAT
32-bit FAT, Ext INT 13
Advanced UNIX
AIX (Linux)
AIX Bootable (Linux)
AIX bootable partition
AIX data partition
Amoeba bad block table
Amoeba file system
AST Windows swap file
BSDI file system or secondary swap
BSDI swap partition or secondary file system
Coherent file system
Coherent swap partition
Commodore DOS
Compaq diagnostics
Concurrent CP/M, Concurrent DOS
CP/M
CP/M 86
CTOS (Convergent Technologies OS)
Cyrnix
Dell partition spanning multiple drives (array)
Disabled NT FAT volume set (Q114841)
Disabled NT IFS volume set (Q114841) (HPFS)
DiskSecure Multi-Boot
DOS 3.3+ second partition
DOS access (Linux)
DR-DOS 6.0 LOGIN.EXE-secured 12-bit FAT partition
DR-DOS 6.0 LOGIN.EXE-secured 16-bit FAT partition
DR-DOS 6.0 LOGIN.EXE-secured Huge partition
Extended partition or Extended volume
Extended partition, Ext INT 13
EZ-Drive 3.05
FreeBSD/386
GNU HURD
GoldenBow VFeature
Hidden 12-bit FAT
Hidden 16-bit FAT>=32 MB, Ext INT 13
Hidden 16-bit FAT, partition<32 MB
Hidden 16-bit FAT, partition>=32 MB
Hidden 32-bit FAT
Hidden 32-bit FAT, Ext INT 13
Hidden IFS
Installable file system: HPFS, NTFS
LANstep
Linux native file system (ext2fs/xiafs)
Linux Swap partition
Linux/Minix v1.4b+
Mach, MtXinu BSD 4.3 on Mach
Microport System V/386
Minix v1.1–1.4a
Mitac Advanced Disk Manager
Mylex DCE376 EISA SCSI controller, past 1024th cyl
NEC MS-DOS 3.x NextStep Partition
Novell Netware
Novell Netware (3.11 and 4.1)
Novell Netware 286
Novell Netware 386
NT FAT volume set (Q114841)
NT IFS volume set (Q114841) (HPFS)
Old MINIX (Linux)
Ontrack Disk Manager 6.0 (DDO)
Ontrack Disk Manager, read/write
Ontrack Disk Manager, read-only
Ontrack Disk Manager, write-only
OPUS
OS/2
OS/2 Boot Manager
OS/2 hiding type 04h partition
PC/IX
Personal RISC Boot
Priam EDISK
Prime
QNX
Save to Disk Partition
Secure File System
SpeedStor
SpeedStor 12-bit FAT extended partition
SpeedStor 16-bit FAT extended partition
SpeedStor Dimensions
SpeedStor Storage Dimensions
SplitDrive
Syrinx
UNIX SysV/386, 386/ix
VENIX 80286.
XENIX /usr file system
Xenix bad-block table
XENIX root file system One partition table composition, denoted herein as the "IBM-compatible" partition table, is found on the disks used in many IBM® personal computers and IBM-compatible computers (IBM is a registered trademark of International Business Machines Corporation). IBM-compatible partition tables may be used on a wide variety of disks, with a variety of partition and file system types, in a variety of ways.

As shown in FIG. 2, an IBM-compatible partition table 32 includes an Initial Program Loader ("IPL") identifier 34, four primary partition identifiers 36, and a boot identifier 38. As shown in FIG. 3, each partition identifier 36 includes a boot indicator 40 to indicate whether the partition in question is bootable. At most one of the partitions in the set of partitions defined by the partition table 32 is bootable at any given time.

Each partition identifier 36 also includes a starting address 42, which is the physical sector address of the first sector in the partition in question, and an ending address 44, which is the physical sector address of the last sector in the partition. A sector count 46 holds the total number of disk sectors in the partition. A boot sector address 48 holds the logical sector address corresponding to the physical starting address 42.

Some IBM-compatible computer systems allow "logical partitions" as well as the primary partitions just described. All logical partitions are contained within one primary partition; a primary partition which contains logical partitions is also known as an "extended partition."

Each partition identifier 36 also includes a system indicator 50. The system indicator 50 identifies the type of file system contained in the partition, which in turn defines the physical arrangement of data that is stored in the partition on the disk 10 (FIG. 1). Values not recognized by a particular operating system are treated as designating an unknown file system. The file system associated with a specific partition of the disk 10 (FIG. 1) determines the format in which data is stored in the partition, namely, the physical arrangement of user data and of file system structures in the portion of the disk 10 that is delimited by the starting address 42 and the ending address 44 of the partition in question. At any given time, each partition thus contains at most one type of file system.

An operating system manages access, not only to the disk 10, but to other computer resources as well. Resources typically managed by the operating system include one or more disks and disk drives, memory (RAM and/or ROM), microprocessors, processors, and I/O devices such as a keyboard, mouse, screen, printer, tape drive, modem, serial port, parallel port, or network port.

It is sometimes desirable to alter the contents of an IBM-compatible partition table. For instance, a person using a computer may wish to move or copy a partition to a different location on the disk while substantially or exactly preserving the number of disk sectors allocated to the partition.

One conventional approach to modification of an IBM-compatible partition table begins by copying all necessary user and system data off the disk to a temporary storage location such as a tape or another disk. The data copied includes without limitation the contents of files created by the user such as textual documents and spreadsheets, the contents of files required to run applications such as word processors, and system data such as directory information. Some internal file system data such as sector allocation maps does not necessarily need to be copied, but is often copied anyway. The familiar disk utility FDISK is then used to update the IBM-compatible partition table. The newly specified partition is then formatted with the familiar disk utility FORMAT or a similar utility (destroying the data on the disk). Finally, the data is copied back into the new partition on the disk. During this copying process the file system copy utility creates appropriate new file system structures reflecting the current locations of data on the disk.

This approach to partition manipulation has several drawbacks. A temporary storage device with adequate storage capacity may not be readily available or affordable under the circumstances. Even if temporary storage is available, copying large amounts of data from the disk to temporary storage and then back again can take a substantial period of time.

In addition, manipulating IBM-compatible partition tables in this manner is confusing and dangerous for many computer users. The FDISK utility assumes that the user is familiar with the intricacies of IBM-compatible partition tables, physical disk addresses, logical partitions, extended partitions, operating system assumptions regarding partitions, and related matters. Users who are unfamiliar with these technical details may easily and inadvertently destroy data.

Less grievous but nonetheless undesirable situations can also arise if the user miscalculates the correct size or position of the new partitions. For instance, if the partition has been made too small to receive all the data from temporary storage, it becomes necessary to once again modify the partition table with FDISK, to reformat again, and to once again copy all the data from temporary storage into the reformatted partition. Even if everything works as desired the first time, this approach to partition modification can be very time-consuming. With a typical disk holding several hundred megabytes of data the process may require several hours to complete successfully.

Some tools, such as those described in the parent applications, do allow users who are unfamiliar with technical intricacies to manipulate IBM-compatible disk partitions more easily than is possible with FDISK. However, the software architecture implemented by previous tools does not cleanly separate file-system-independent components from file-system-dependent components. As a result, the architecture design makes it difficult to "plug in" modules which support additional file systems or modules which make better use of knowledge about the internal file-system-dependent structure of a partition, such as the file system structures that track bad sectors.

Determining where to draw the line that separates file-system-independent components from file-system-dependent components is not trivial. It is true that relatively few partition manipulations are generally needed; the main ones sought are move, copy, shrink, expand, and cluster resize.

However, these manipulations often involve subtleties that arise from overlapping partitions, file system requirements, bad sectors, error handling, physical disk configurations, data structure limitations, or other factors. In addition, a wide variety of file systems using very different system structures is possible. As a result, there are many places where a line separating file-system-independent components from file-system-dependent components might be drawn, with varying degrees of success. The implications of choosing a particular line of separation may also be hard to determine without extensive insight and experimentation.

Thus, it would be an advancement in the art to provide a system which implements a software architecture that cleanly separates file-system-independent components from file-system-dependent components.

It would be an additional advancement to provide such a system which reflects knowledge of subtle factors that can change the efficiency, correctness, or safety of partition manipulations.

Such a system is disclosed and claimed herein.

BRIEF SUMMARY OF THE INVENTION

The present invention provides methods and systems for implementing partition manipulation tools. One embodiment of a partition manipulation system implements an architecture that supports multiple file systems on a computer. The computer has a partitionable storage medium for holding data in sectors according to a partition table.

The computer system includes a data replicator for replicating data from source sectors in a selected partition to destination sectors in a modified partition in the partitionable storage medium. The data replicator has an initialization interface for interfacing to an initialization module. The initialization interface has a generic format that is substantially independent of each file system used on the computer system. One embodiment of the initialization interface includes a source sector identification, such as a sector or cluster bitmap or runmap, that identifies the source sectors; a destination sector identification that identifies the destination sectors; a bad sector identification; and a result generated in response to events such as success, memory allocation errors, disk access errors, and requests for replication that would place file system or other critical structures in bad sectors.

The computer accordingly also includes at least one initialization module. The initialization module(s) may be specific to one or more file systems, or they may be default modules which are file-system-independent. The initialization module(s) generate source sector identifications and otherwise interface with the data replicator through the initialization interface. One default initialization module requests "dumb" replication by identifying all sectors in the selected partition. Some file-system-specific initialization modules request "smart" replication which avoids bad sectors.

A partition table utilizer in the system provides access to the partition table to maintain the integrity and self-consistency of the partition table during and/or after data replication.

The data replicator also has a verification interface for interfacing to verification modules; the verification interface has a generic format that is substantially independent of the file system. The system accordingly includes at least one verification module which is specific to the file system, for verifying the integrity and self-consistency of system structures used by the file system, and for interfacing with the data replicator through the verification interface.

The data replicator also has a completion interface for interfacing to completion modules according to a generic, file-system-independent format. The system includes at least one completion module which is specific to the file system for updating system structures used by the file system to avoid bad sectors.

In operation, partitions may be copied and/or moved, within a disk, or between disks. The data replicator uses a memory buffer to temporarily store data during replication. However, a copy of every sector in the selected partition is preferably maintained in at least one sector on the disk at all times to avoid loss of user data in case replication is interrupted by the user, by a power failure, or for some other reason.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The summary and detailed descriptions of the inventions of the parent applications are incorporated herein by reference. For convenience, portions of the parent applications are also reproduced below.

Figure 2:
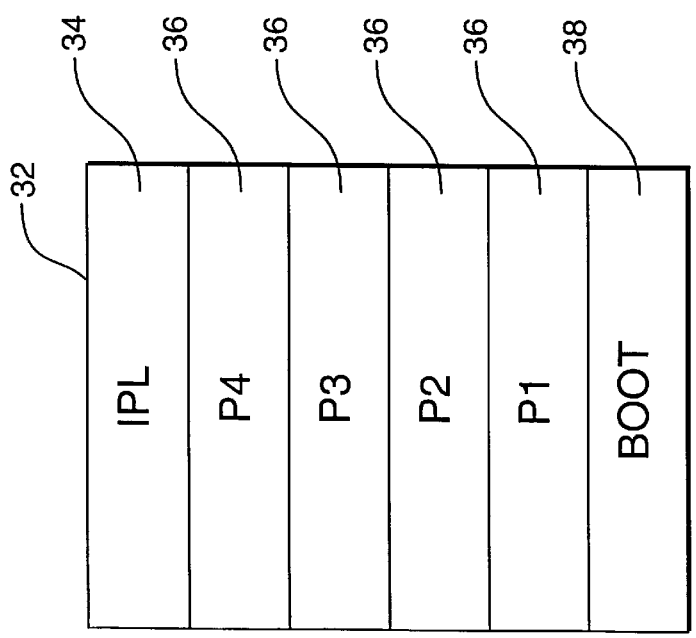
FIG. 2 is a diagram illustrating an IBM-compatible partition table.
Figure 4:
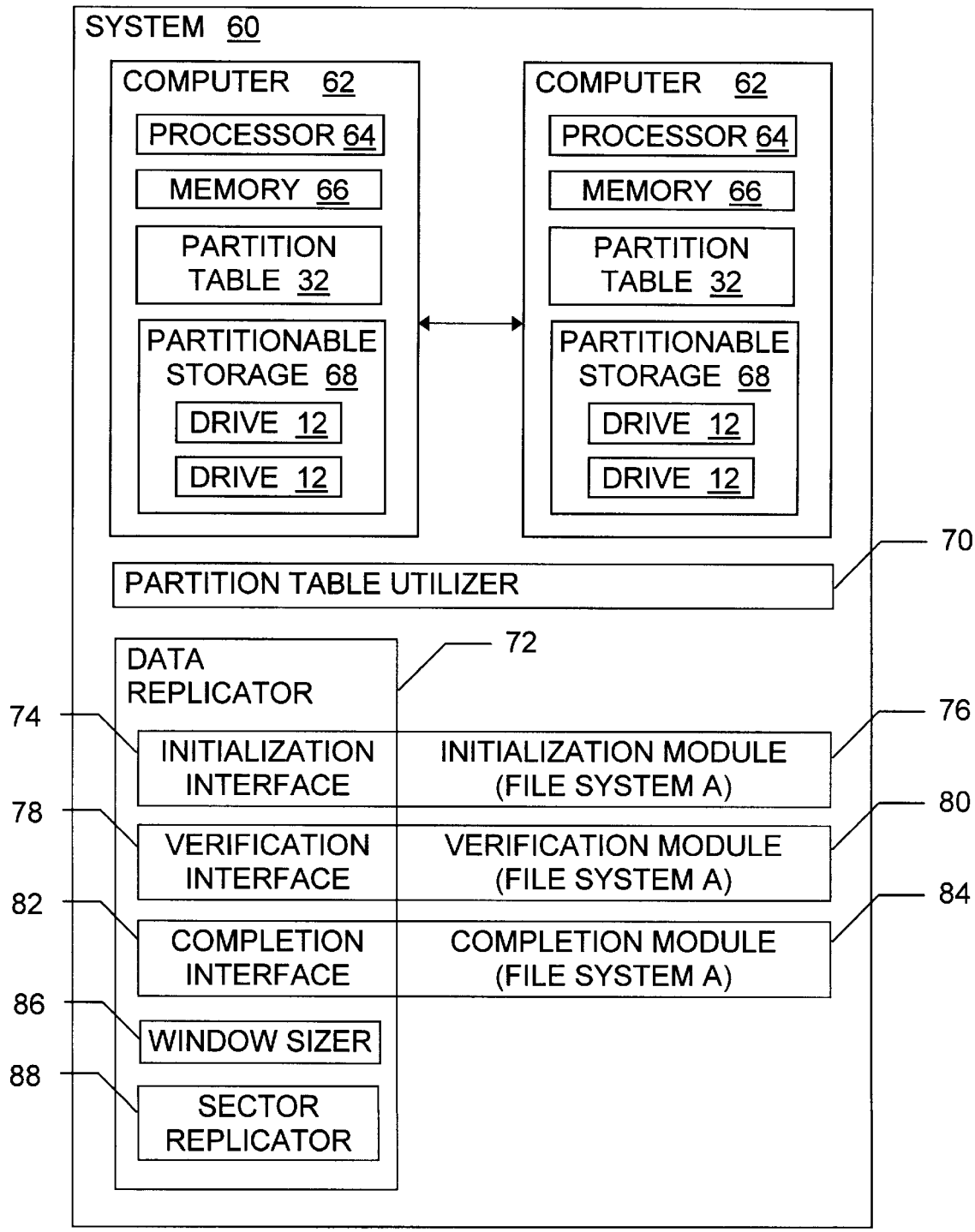
FIG. 4 is a diagram illustrating a system which implements an architecture of the present invention.

The present invention relates to a system for implementing a partition manipulation architecture capable of supporting multiple file systems on a computer. One such system 60 is illustrated in FIG. 4. The system 60 includes at least one computer 62 which has a processor 64 for executing instructions, a memory 66 for storing instructions, and a partitionable storage medium 68 for holding data in sectors according to the partition table 32 (FIG. 2). The partitionable storage medium 68 includes one or more non-volatile storage devices such as magnetic or optical disk drives 12. The memory 66 and the partitionable storage medium 68 can be written and read by execution of appropriate processor 64 instructions.

Each computer 62 may be a server connected by network signal lines to one or more network clients, or it may be a network client, or it may be a standalone machine. A server computer 62 may be configured as an Internet server, as an intranet server, as a name server, or as a combination thereof. A given computer 62 may also function both as a client and as a server; this may occur, for instance, on computers 62 running Microsoft Windows NT software (WINDOWS NT is a trademark of Microsoft Corporation). The processor 64 may be a uniprocessor or a multiprocessor. Suitable computers 62 include, without limitation, personal computers, laptops, and workstations. Although particular individual and network computer system 60 components are identified herein, those of skill in the art will appreciate that the present invention also works with a variety of other systems 60.

The illustrated embodiment includes two computers 62 connected by a network, modems, or other familiar means; some alternative embodiments include just one computer 62, while others include more than two computers 62. The selected partition and the modified partition discussed herein may reside on overlapping portions of a single drive 12, on different portions of a single drive 12, on different drives 12 attached to the same computer 62, or on different drives 12 attached to different computers 62.

Replication may proceed directly from a source computer 62 to the ultimate destination computer 62, or replication may proceed in stages which use network server files as intermediate storage. A CD-ROM, a removable file storage device, or another computer-accessible storage medium may also be used as intermediate storage.

The software which facilitates the replication may be loaded for execution from a drive 12 on the computer 62 that holds the selected partition, or the software may be loaded over a network or other connection from a file server or some other computer 62.

The system 60 also includes a partition table utilizer 70 which is capable of extracting from the partition table 32 information such as partition boundaries, partition sizes, partition types, and whether a partition is bootable. The partition table utilizer 70 is also capable of modifying the partition table 32 to reflect changes in such information (once the changes are supplied to the utilizer 70), and of performing the modifications subject to locks and/or semantic constraints to maintain the integrity self-consistency of the data stored in the partition table 32.

The partition table utilizer 70 may be embodied in software which runs on the computer 62 and which reflects the semantic constraints imposed on partitions. Perhaps the simplest such constraint is that no sector belongs to two non-extended primary partitions. Other semantic constraints on partitions are also well-known. The partition table 32 and an executable copy of the partition table utilizer 70 will typically be stored on one of the disk drives 12 in the partitionable storage 68, but are shown separately for clarity of illustration.

The system 60 also includes a data replicator 72. The data replicator 72 is capable of replicating data from a source sector (such as sector 16 or 18 in FIG. 1) in a selected partition to a destination sector in a modified partition in the partitionable storage medium 68. Like the partition table utilizer 70, the data replicator 72 may include software and an executable copy of the software may be stored on one of the disk drives 12 in the partitionable storage 68.

Strictly speaking, there is no modified partition until the partition table 32 (FIG. 2) is updated, even if all the disk sectors that will lie in the modified partition have been updated to contain appropriate file system structures and user data, because partitions are defined by entries in the partition table 32. However, for convenience the term "modified partition" means "intended or actual modified partition." That is, "modified partition" is used to denote both the partition that is produced from the selected partition and the collection of disk sectors which that modified partition is intended to occupy. Accordingly, one may speak of a modified partition, based on an identified selected partition and an identified operation to be performed on the selected partition, even before the partition table 32 is updated and even if the replicating operation is stopped before the partition table 32 is updated.

Details regarding data replicator 72 software are provided below and elsewhere. Source sector identification is also discussed in connection with FIGS. 6 and 7, and selected partitions and modified partitions are discussed in connection with FIGS. 8 through 11. The term "replicate" is used herein to indicate moving (as in FIGS. 8 through 10) and/or copying (as in FIG. 11).

The data replicator 72 has an initialization interface 74 for interfacing to one or more initialization modules 76. The initialization modules 76 will often be file-system-specific, but a file-system-independent initialization module 76 may be provided as a default for use when no other modules 76 are available. In one embodiment, a default initialization module is provided as a C++ base class, and simply requests replication of all disk sectors in the partition without attempting to determine whether a collision with bad sectors in the modified partition can be avoided. If a bad sector is found, the replication operation is terminated and the partition table 32 is not modified. Other initialization modules 76 are file-system-specific and are capable of relocating file system structure and/or user data sectors in the selected partition before their replication to avoid a collision with bad sectors in the modified partition. File-system-specific initialization modules 76 may be provided in classes which override the default file-system-independent module 76 base class.

In one embodiment, the initialization module 76 is invoked through the following C++ class member function header embodiment of the initialization interface 74:

virtual PQRET BeginMove( PARTITION_INFO *srcPi,
       STATE_MAP *p, BAD_SECT_LIST *bsl, PARTITION_INFO *destPi, ULONG *ulSectsPerBlock, ULONG *ulTotalBlocks);
where PARTITION_INFO is described below, STATE_MAP is a bitmap or a runmap or some other identification of which sectors to replicate from the source (selected) partition to the destination (modified) partition, BAD_SECT_LIST is a linked list or table or other identification of addresses of bad sectors, ulSectsPerBlock corresponds to the indicator 98, and ulTotalBlocks is the total number of file allocation units in the partition. In an alternative embodiment, ulSectsPerBlock and ulTotalBlocks are implicit constants rather than parameters. Of course, global variables may also be used in some cases to replace parameters passed on a stack. The initialization interface 74 is discussed further below in connection with FIG. 5.

For clarity, the system 60 shown contains only one initialization module 76, but other embodiments include several initialization modules 76. Additional initialization modules 76 either support other file systems, or make better use of knowledge about the file-system-dependent internal structure of a partition. In one embodiment, for instance, one module 76 supports FAT partitions and replicates around bad destination sectors, a second module 76 supports fast replication of NTFS partitions but fails when a bad destination sector is encountered, and a third module 76 supports a slower replication of HPFS partitions which works around bad destination sectors.

More generally, different embodiments of the initialization modules 76 and data replicator 72 follow different patterns with regard to bad sectors in the modified partition. The most powerful embodiments first identify any bad sectors in the modified partition. If bad sectors are found, the system 60 determines whether the relative positions of bad sectors in the modified partition and the relative positions of file system structure or user data sectors in the selected partition intersect. If the relative positions intersect then a collision would occur. That is, an attempt would be made during replication to write a file system structure or user data sector to a bad sector, posing an unacceptable risk of loss of user data. The system 60 therefore relocates the selected partition sectors that would collide, placing them at new relative positions so that no collision will occur. File system integrity and internal consistency must be maintained by such relocation, so relocation requires use of a file-system-specific initialization module 76. The data replicator 72 then performs the requested replication to produce the modified partition; a file-system-specific completion module 84 may be used to update the bad sector table in the modified partition.

One procedure for relocating data so that only vacant sectors "collide" (vacant sectors are not written) with bad sectors is described in a parent application for the NTFS file system, and repeated below for convenience. Similar procedures may be used with other file systems:

While there are set bits in the volume bitmap for the region of clusters being vacated,
    For each file in the master file table (AMFT@),
    For each run of clusters contained in the file being tested,
    If the run being tested is wholly or partly in the region of clusters being vacated,
    If there is a blank area in the region of clusters being retained the size of the run being tested,
    Set the bits for the blank area in the volume bitmap.
    Copy the data from the area mapped by the old run to the blank area.
    Change the run in the file to point to the new area.
    Clear the bits representing the old run in the volume bitmap.
Else
    Locate several runs in blank areas whose sizes total the size of the portion of the run that is in the region of clusters being vacated.
    Set the bits for the new areas in the volume bitmap.
    Copy the data from the area mapped by the old run that are in the area being vacated to the new runs.
    Calculate the new run map for the file.
    If the new run map is too large for the current MFT File Record for the file, including all of its extensions
    If the MFT does not contain any blank entries,
    If the MFT has a multiple of 64 entries,
    Add 64 clear bits to the MFT bitmap.
End if
    Add 8 blank entries to the MFT adding enough clusters to it to hold 8 File Records and formatting the entries as blank entries.
End if
    Format the next available position in the MFT as an extended File Record.
    Set the bit in the MFT bitmap for the new File Record.
    If this is the File Record for the MFT itself (File Record 0),
    Move the run map minus the runs describing the first 16 File Records from the base File Record to the new File Record.
Else
    Move the entire run map from the base File Record to the new File Record.
End if
    If the base File Record lacks an ATTRIBUTE_LIST attribute,
    Create an ATTRIBUTE_LIST attribute.
End if
    Store the calculated run map in the File Record.
    Clear the bits representing the old run in the volume bitmap.
End if
End if
End if
End for
End for
End while A second initialization module 76 embodiment, less powerful than the first but still very useful, identifies bad sectors and detects collisions but returns an error message rather than trying to relocate selected partition sectors to avoid the collision. This approach may also use a file-system-specific initialization module 76 to avoid reporting a collision when the bad sector is at a relative location corresponding to a selected partition sector that contains neither file system structures nor user data.

A third approach simply checks for bad sectors and reports an error if any are found. A fourth approach, which identifies bad sectors only after attempting to write file system structures or user data during replication, is also possible but is not preferred.

Initialization modules 76 may also relocate file system structures or user data to improve the efficiency of replication, the efficiency of file system use, or both. For instance, the partition may be defragmented, or it may be aligned with track or cylinder boundaries.

The illustrated data replicator 72 also has a verification interface 78 for interfacing to one or more verification modules 80, and a completion interface 82 for interfacing to one or more completion modules 84. The verification modules 80 and completion modules 84 may be default modules which are file-system-independent, or they may be file-system-specific modules, or a mixture of the two types. Some embodiments of the system 60 lack one or more of these interfaces 74, 78, 82 and accordingly lack the corresponding modules 76, 80, 84.

One file-system-independent verification module 80 always presumes that the file system integrity and internal consistency are intact; "verification" always succeeds. File-system-dependent verification modules 80 perform integrity checks such as those performed by the familiar CHKDSK program.

In one embodiment, the verification module 80 is invoked through the following function header embodiment of the verification interface 78:

PQRET Check(PARTITION_INFO *pi)

where PQRET provides the return values discussed in connection with FIG. 5, and pi points to a description of the partition to verify. One embodiment of a PARTITION_INFO structure is defined as follows:

```
typedef struct partition_info_tag
{
    struct partition_info_tag *piNxt;      // next on this drive
    DISK_INFO *di;                          // DISK_INFO for physical drive
    ULONG Flags;                            // Partition Info Flags
    various constants removed from defines to aid formatting
    // Operations allowed on this partition:
    #define PI_LABEL              // can have its label changed
    #define PI_COPY               // can be copied
    #define PI_HIDE               // can be hidden
    #define PI_UNHIDE             // can be made visible
    #define PI_BS_RETEST          // can be retested for Bad sectors
    #define PI_SET_ACTIVE         // can be set active
    #define PI_RESIZE_CLUST       // can have clusters resized
    #define PI_RESIZE_ROOT        // can have the root resized
    #define PI_FORMAT             // can be formatted
    #define PI_DELETE             // can be deleted
    #define PI_CREATE             // can be created
    #define PI_RESIZE             // can be resized
    #define PI_CONVERT            // can be converted
    #define PI_MOVE               // can be moved
    #define PI_CHECK              // can be checked
    #define PI_INFO               // Info is available
    #define PI_ALL_OPS
    // Location and size of partition:
    ULONG StartSect;              // start sector relative to beg. of disk
                                  // (disk begins with boot sector, not EPBR)
    ULONG NumSects;               // total num of sectors in the partition
    // Variables set by fast chkdsk:
    ULONG UsedSects;              // # of sectors used
    ULONG FreeSects;              // # of sectors free
    ULONG ulEstFilesAndDirs;      // Estimated number of files & dirs
    Variables for resizing
    // Location of partition table entry.
    ULONG PartitionSect;          // partition sector relative to beg. disk
    UCHAR PartitionIndex;         // Index into partition table
    #define              NO_PARTITION_TABLE
    // PartType is the partition type value stored in the partition
    // table. It may or may not be correct. Examples are listed in the
    // Technical background portion of this patent application.
    UCHAR PartType;      // file system type (value from partition table)
    UCHAR FSType;        // File System Type
    #define FS_UNKNOWN       PART_UNKNOWN
    #define FS_FAT           PART_FAT12
    #define FS_XENIX         PART_XENIX
    #define FS_FREE          // Free space
    #define FS_NTFS          // NTFS (may reside in PART_IFS or PART_FAT)
    #define FS_EXTEND PART_EXTEND   // THE one Extended Partition
    #define FS_EPBR          // EPBR - Don't display this "partition"
    #define FS_HPFS          PART_IFS   // HPFS
    #define FS_EXT2FS        // Linux ext2fs
    #define FS_LINUX         // Linux/Minix (various) Partitions
    #define FS_PQFLEX        // PowerQuest Flex Partition Format
    #define FS_NETWARE       // Netware Partition
    #define FS_NOFORMAT      // Not formatted
    #define FS_HIGHEST_VAL   FS_NOFORMAT // highest FS_xxxx value used
    // Identity of the partition:
    char DriveLetter;             // Drive Letter assigned to this drive
    #define PI_NODL               // unknown or no drive letter
    ULONG SerialNumber;           // Serial Number of the partition or 0
    #define PI_VOL_LEN 16         // Length allowed for the volume label
    char  VolLabel[PI_VOL_LEN];   // Volume Label
    #define PI_VOL2_LEN           // Length allowed for 2nd volume label
```

```
    char    acVolLabel2[PI_VOL2_LEN];    // Alternate Volume Label
    // Support file systems where logical sector size != 512 bytes:
    USHORT      BytesPerSect;       // # of bytes per logical sector
    USHORT      PhySectsPerLog;     // # of physical sects per log sect
    ULONG  ulOSHandle;              // OS Specific Handle to drive
    ULONG  ulXStartSect;            // starting sector
    //buffer
    ULONG  ulXNumSects;             // total # of sectors in the partition
    ULONG  ulXPartSect;             // partition table sector
    UCHAR  ucXPartIndex;            // Index into partition table
    UCHAR  ucXPartType;             // partition type (from partition table)
    UCHAR  ucXFSType;               // File System Type
    UCHAR  ucPadl;                  // Pad to align on DWORD boundary
} PARTITION_INFO;
```

The verification module 80 may be invoked by the data replicator 72 to verify that the file system structures in a partition are internally consistent. For instance, a FAT verification module 80 performs the verification steps carried out by the well-known CHKDSK program, but also interfaces with the data replicator 72 according to the file-system-independent interface 78. In a preferred embodiment, the data replicator 72 invokes the verification module 80 for the file system of a given partition before replicating any data of the partition, and invokes the verification module 80 again after replicating the data.

One file-system-independent completion module 84 always presumes that the modified partition contains no bad sectors not already identified (by relative position or otherwise) in the bad sector table of the selected partition. By contrast, some file-system-dependent completion modules 84 update the modified partition's bad sector table using a bad sector identification 96 (FIG. 5).

More generally, one file-system-independent completion module 84 always presumes that the modified partition file system structures do not need to be updated after replication by the data replicator 72. Conversely, some file-system-dependent completion modules 84 update the modified partition's boot record, for instance, when the modified partition is a FAT, HPFS, or NTFS partition, or update the backup boot record of an NTFS partition. File-system-dependent completion modules 84 are suitable whenever file system structures specify the location of a disk sector or of a system structure relative to the disk boundary instead of specifying a location relative to a partition boundary. A file-system-dependent completion module 84 is also suitable for updating certain operating system structures, such as the partition number in a Microsoft Windows registry.

In one embodiment, the completion module 84 is invoked through the following C++ class member function header embodiment of the completion interface 82:

virtual PQRET EndMove( PARTITION_INFO *srcPi, BAD_SECT_LIST *bsl, PARTITION_INFO *destPi, LOGHAND lhDest);

where BAD_SECT_LIST and PARTITION_INFO are as previously described, and LOGHAND is a typedef of ULONG (the C++ unsigned long variable type) used as a handle to a logical disk I/O session, e.g., for locking and unlocking the disk to prevent interference by other processes if partition replication is interrupted. Locking and unlocking may also be performed by the data replicator 72. One embodiment of the completion module 84 updates the file system's bad sector table and unlocks the partition. Partition locking and unlocking may be accomplished by use of a recovery partition indicator as disclosed in the parent applications.

Figure 5:
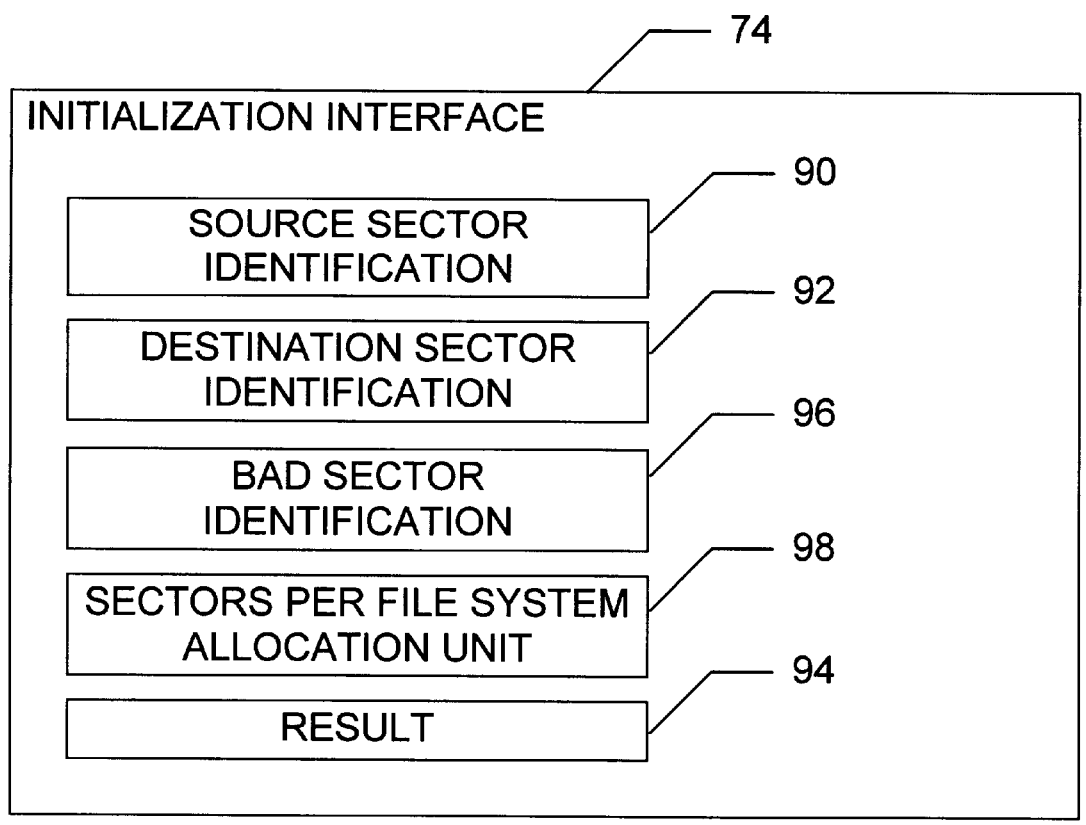
FIG. 5 is a diagram further illustrating an initialization interface shown in FIG. 4.

One embodiment of the initialization interface 74 is illustrated in FIG. 5; reference is also made to FIG. 4. The interface 74 includes a source sector identification 90 which identifies the source sector or sectors to be replicated by the data replicator 72. The source sector identification 90 is provided to the data replicator 72 to specify which sectors of the selected partition should be replicated to produce the modified partition. Source sector identifications 90 are discussed further in connection with FIGS. 6 and 7.

The interface 74 may include a destination sector identification 92 identifying the destination sector or sectors for the replication. In one embodiment, the destination sector identification 92 is provided to the data replicator 72 through a user interface such as a graphical user interface (GUI) described in the parent applications. In one embodiment the data replicator 72 sends the destination sector identification 92 to the initialization module 76 so that the initialization module 76 can check the modified partition for bad sectors, and (in some cases) relocate user data and/or file system structures in the selected partition to avoid collisions with bad sectors.

The destination sector identification 92 may include the address of the first sector in a destination location or the address of the last sector, as well as an indication of whether replication proceeds up (sometimes called "right") or down ("left") from the address provided. The number of sectors to replicate may also be provided.

A result 94 may be set by the initialization module 76. Typical result 94 values include "success", "memory allocation failed", and "disk error." Other results passed through the initialization interface 74 may include "operation canceled by user", "could not lock partition", "unexpected internal error", "requested replication not allowed", and identification of other unusual or error conditions.

A requested replication may be disallowed by the initialization module 76, for instance, if it would place the boot sector on a bad sector. More generally, requested replications should be disallowed if they would place file system structures or user data on bad sectors. A file-system-specific initialization module 76 may contain software to relocate file system structures or user data sectors to avoid such placement.

The verification interface 78 and the completion interface 82 likewise contain a result field. Verification module 80 result values may include those already listed for the initialization result 94, as well as a variety of file-system-specific error indications such as those provided by ScanDisk or CHKDSK. Completion module 84 result values may include "success", "disk error", "operation canceled by user", "could not unlock partition", "unexpected internal error", and values identifying other conditions.

Figure 1:
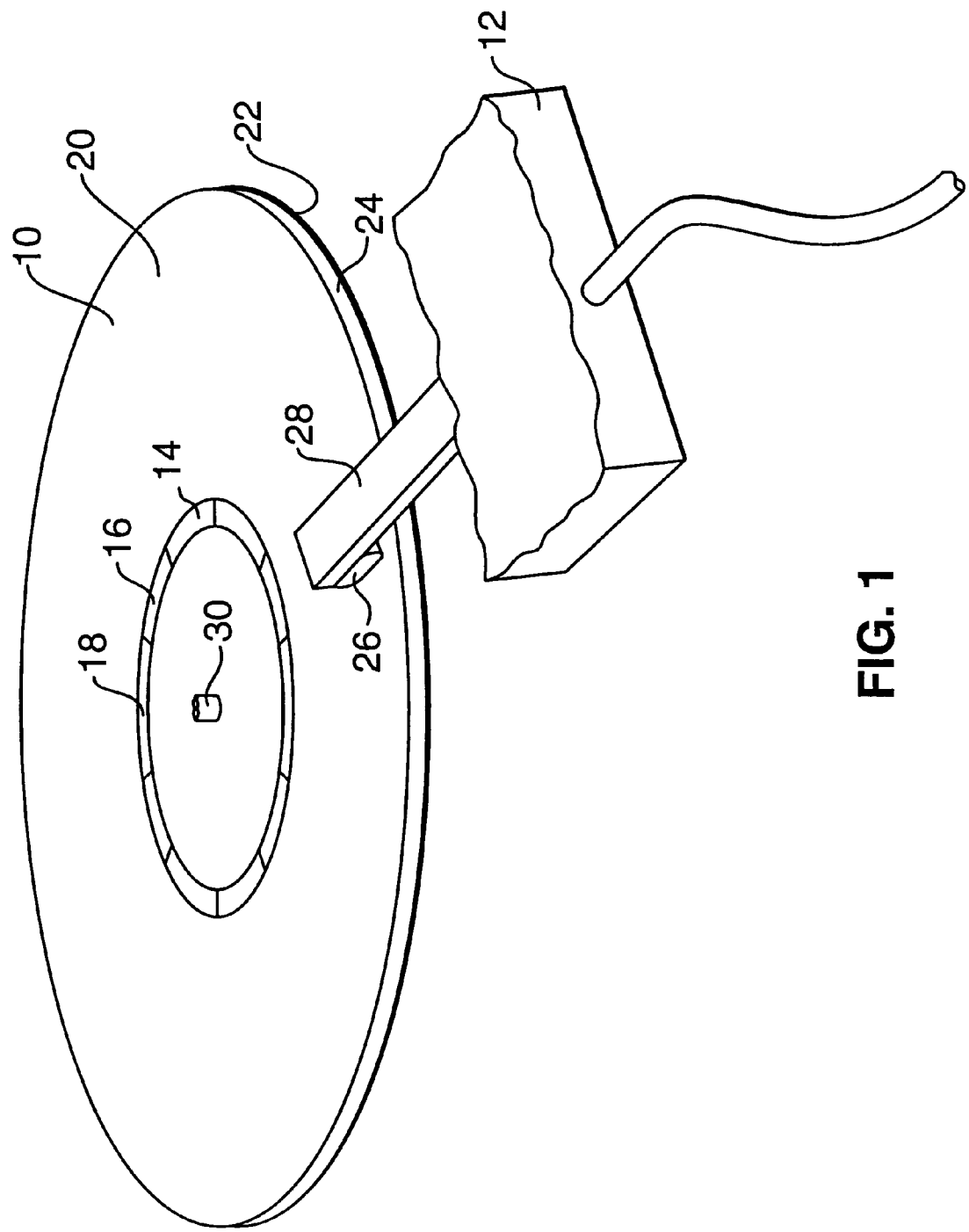
FIG. 1 is a partial cut-away view of a computer disk.
Figure 3:
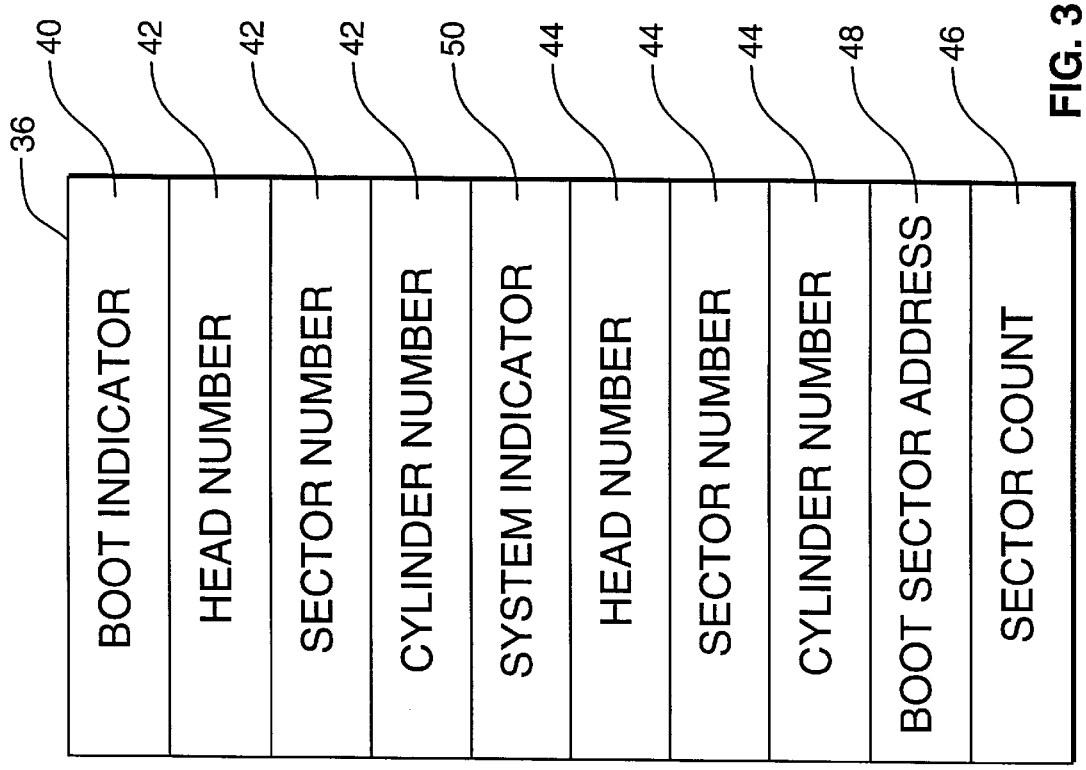
FIG. 3 is a diagram further illustrating a portion of the partition table shown in FIG. 2.

The embodiment of the initialization interface 74 shown in FIG. 5 also includes a bad sector identification 96. This may be implemented as a list or table of known or suspected bad disk sectors. Bad sectors may be identified by reading bad sector tables maintained by file systems, operating systems, or disk controllers, or the list may be generated by flushing the disk cache and then attempting to read from the disk drive 12 (FIG. 1).

The bad sector identification 96 may be generated by the data replicator 72 and/or by the initialization module(s) 76. The identification 96 may be used solely internally by the component which generates it, or it may be transferred between the data replicator 72 and the initialization module (s) 76, for use by the other component or for use by both components. The bad sector identification 96 may identify bad sectors in the selected partition, in the modified partition, or in both partitions.

The illustrated embodiment of the initialization interface 74 also includes an indication 98 of the number of sectors in a file system allocation unit used by the file system to which a given initialization module 76 is tailored. Familiar file system allocation units include individual sectors and so-called "clusters" of sectors.

Other embodiments of the initialization interface 74 include other components, such as a version number, a file system identifier, and an indication of whether the initialization module 76 in question is "smart" in that it works around bad disk sectors.

Figure 6:
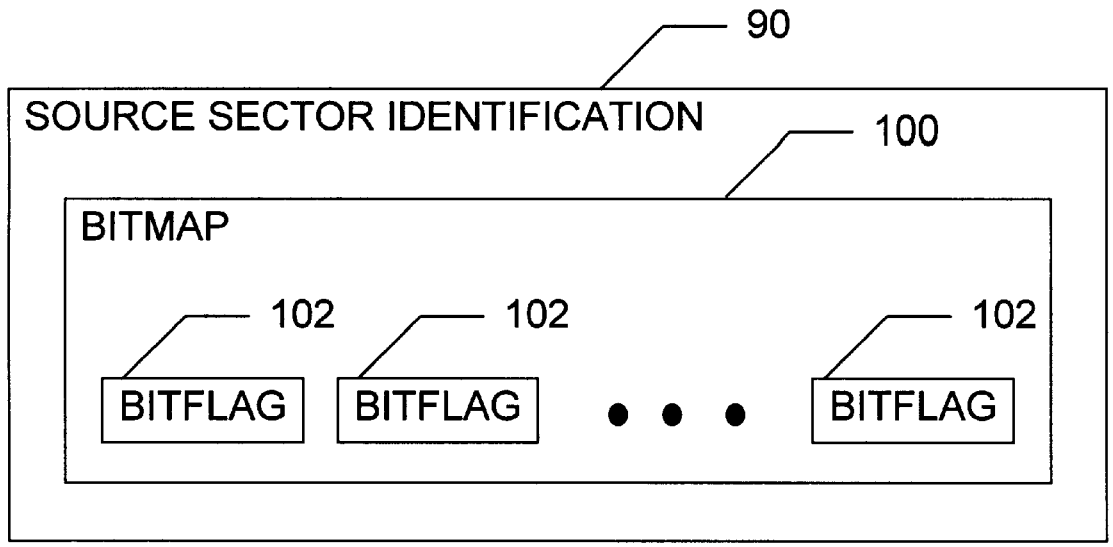
FIG. 6 is a diagram illustrating a bitmap embodiment of a source sector identification shown in FIG. 5.
Figure 7:
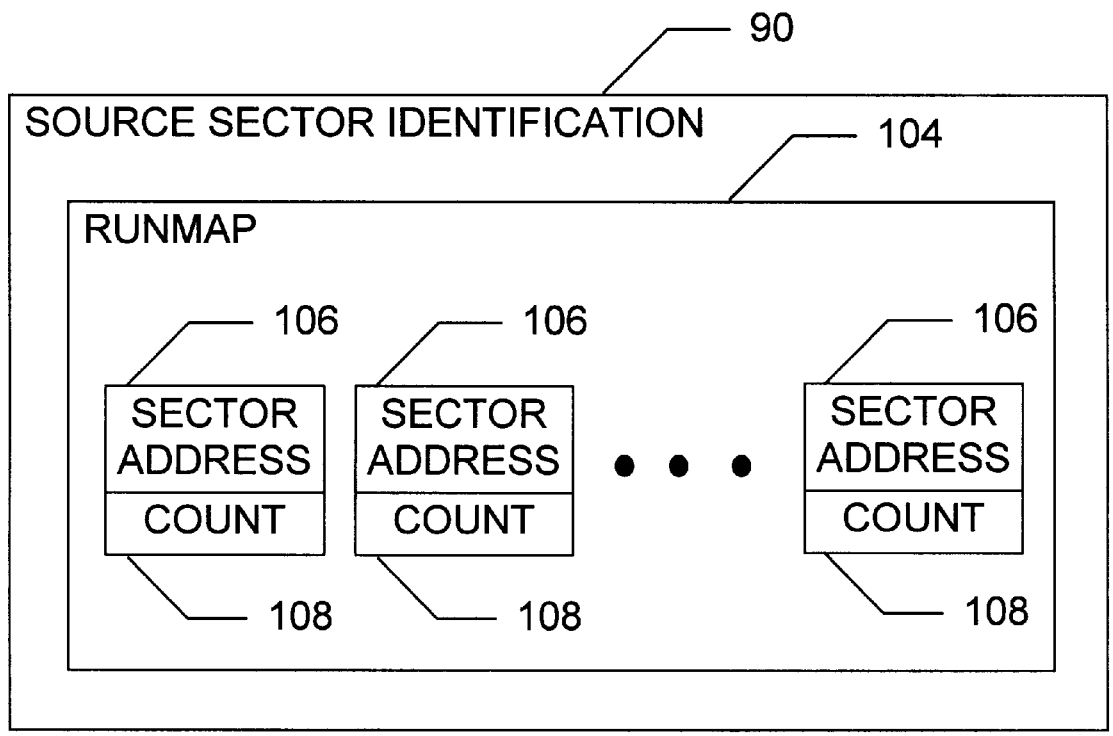
FIG. 7 is a diagram illustrating a runmap embodiment of the source sector identification shown in FIG. 5.

Alternative embodiments of the source sector identification 90 are illustrated in FIGS. 6 and 7. The embodiment in FIG. 6 includes a bitmap 100 containing one bitflag 102 for each sector in the source partition. The bitflag 102 corresponding to a given sector is set if that sector is to be replicated, and clear otherwise. The embodiment in FIG. 7 includes a runmap 104 containing a starting sector address 106 and a sector count 108 for each run of sectors in the source partition which is to be replicated. A run starts at the indicated starting address 106 and includes the indicated number 108 of contiguous sectors. A file allocation unit may be an individual sector or a cluster of contiguous sectors. A variation on these embodiments uses bitflags 102 and {address 106, count 108} pairs that refer to clusters or other file allocation units rather than individual sectors.

Operation of the data replicator 72 and other components of the system 60 is further illustrated in FIGS. 8 through 11; reference is also made to FIG. 4. As noted, the modules 76, 80, 84 provide services to the data replicator 72 through the interfaces 74, 78, 82. In one embodiment, an initialization module 76 provides the data replicator 72 with the identity of the source sectors which are to be replicated and a list of any known bad sectors in the destination. The data replicator 72 obtains the destination from the user through a GUI and replicates the indicated source sectors to the specified destination using a window sizer 86 and a sector replicator 88 as explained below. After replication, the data replicator 72 passes the completion module 84 any further information obtained about bad sectors during the replication, and the completion module 84 updates the file system structures in the replicated partition.

Figure 8:
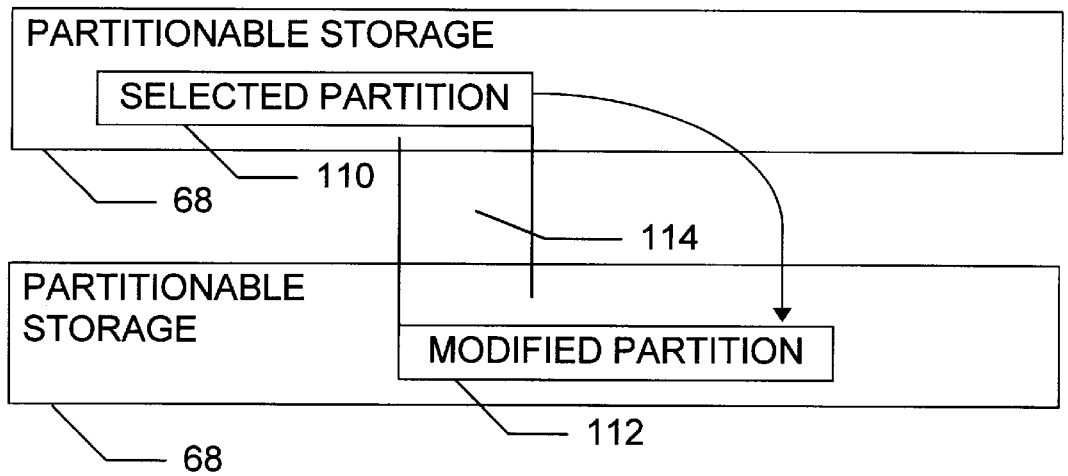
FIG. 8 is a diagram illustrating a partition manipulation which moves a partition to the right to a location that overlaps its original location.
Figure 9:
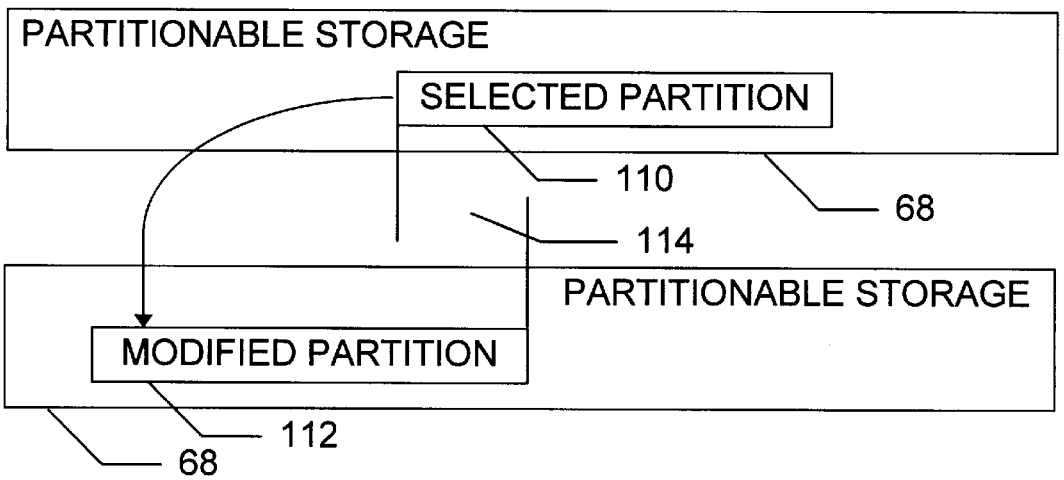
FIG. 9 is a diagram illustrating a partition manipulation which moves a partition to the left to a location that overlaps its original location.
Figure 10:
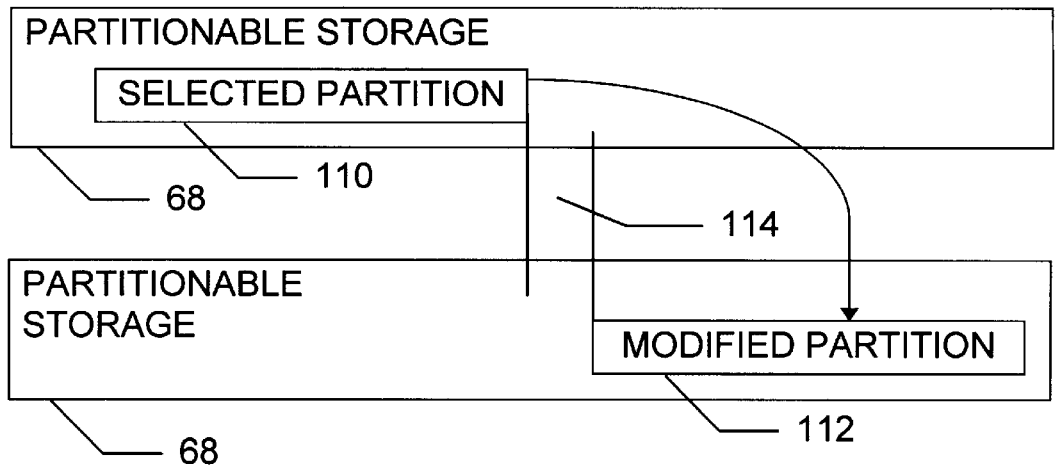
FIG. 10 is a diagram illustrating a partition manipulation which moves a partition to a location that does not overlap its original location.

The system 60 allows users to replicate a selected partition 110, thereby creating a modified partition 112. As illustrated in FIGS. 8 through 10, replication may create the modified partition 112 by moving the selected partition 110 from a source location to a destination location in the partitionable storage 68. The source and destination locations may be on the same disk drive 12 or on different disk drives 12, on the same or different computers 62.

The source location, shown in the upper portion of each of FIGS. 8 through 11, may or may not overlap the destination location, shown in the lower portion of the Figures. In the replication examples of FIGS. 8 and 9, a non-empty overlap 114 exists, while in the examples of FIGS. 10 and 11, the overlap 114 is empty. Regardless of whether the source and destination locations overlap, the selected partition 110 is removed from the source destination as a result of the moves shown in FIGS. 8 through 10, and left intact as a result of the copy shown in FIG. 11.

The overlap 114 influences the size of a "window," which is a group of sectors buffered together in volatile memory to be replicated, because it is preferable to avoid overwriting the selected partition 110 until absolutely necessary. This goal follows from the goal of always maintaining on disk at least one copy of each data sector used by the selected partition, to avoid losing data if the replication is interrupted. As explained below, making the window too large increases the risk these goals will not be met.

In theory, replication could proceed through the sectors of the selected partition 110 in any order. However, it is convenient for replication to begin with one or more sectors located at one end of the selected partition 110 and proceed until reaching the last sector at the opposite end of the selected partition 110. For purposes of illustration, assume that replication begins with the left-most sector; the methods discussed are readily applied by those of skill in the art if the order of replication is reversed or otherwise altered.

Consider the situation shown in FIG. 8. Suppose the leftmost sector of the selected partition 110 is replicated to its new position at the leftmost location in the modified partition 112. Then a sector within the selected partition will be overwritten and its contents will be lost (or will be susceptible to loss if previously stored only in volatile memory), because the overlap 114 is not empty and the overlapped portion of the selected partition 110 has not been saved elsewhere on disk.

One solution is to replicate from right to left instead of from left to right. Another solution is to save the overlapped portion of the selected partition 110 elsewhere on disk before overwriting that portion. These approaches may be combined with defragmenting and other compression methods which reduce the size of the user data portion of the selected partition 110 and thus reduce the portion of the overlap 114 that actually poses a problem.

As a precaution, one embodiment of the invention limits the window size to make it no larger than the size of the portion of the modified partition 112 that lies outside the overlap 114, as shown in FIG. 9. This ensures that sectors of the selected partition 110 are not overwritten until necessary, thereby reducing the risk of data loss. A similar constraint can be enforced when replicating from right to left in a situation like that shown in FIG. 8. The window size may be as large as the entire selected partition 110 if the overlap is empty, such as in FIG. 10. Some embodiments also reduce the window size to increase the frequency of GUI updates which inform users as the replication progresses.

Figure 11:
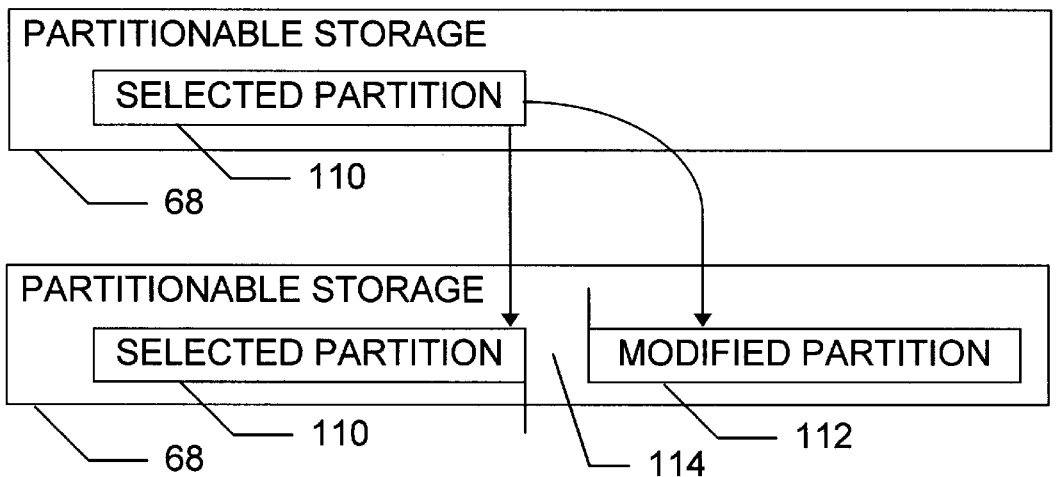
FIG. 11 is a diagram illustrating a partition manipulation which copies a partition to a location that does not overlap its original location.

As illustrated in FIG. 11, replication may also create the modified partition 112 by copying the selected partition 110 from a source location to a destination location. After a copy, the selected partition 110 still exists at the source destination, so the source location and destination location must not overlap.

With reference to FIG. 4, in one embodiment the data replicator 72 includes software described by the following C++ code and pseudocode:

```
15    PQRET pqMove(              // Move a partition
            PARTITION_INFO *pi,  // Partition to act upon
            ULONG ulStartSect,   // New starting sector
            ULONG ulOpFlags)
      {
20          MOVE_INFO mi;        // Move boundaries
            ULONG ulLimit;       // Limit of movement
            PQRET pqRet;         // return value
            PQRET pqRet2;        // 2nd return value
            LOGHAND lh;          // Open a handle to pi
25          ULONG ulQuarantine = LL_QUARANTINED;// (assume the worst)
            COMPLETION_STATE eUpdateParts = COMPLETE; // do with afterwards SaveState( pi );     // Save off some state information 30          enGetMoveInfo( pi, &mi );    // get move bounds
            if (ulStartSect == pi->StartSect)   // if no movement
            {
      no_change:
                return ERR_NO_CHANGE;
35          }
            else if (ulStartSect < pi->StartSect) // if moving down/left
            {
                // can't start after here
                ulLimit = pi->StartSect - mi.ulFreeBefore;
40              ulStartSect = pqRoundPos(    // round to cylinder boundary
                            pi->SectsFirstCylinder, //# sects first cylinder
```

```
                            pi->SectsPerCylinder,   //# sects all other cyls
                            ulStartSect,            // Number to round, in sectors
                            RS_DOWN );              // Round down if moving down
                while (ulStartSect < ulLimit) // While too low
                {
                        ulStartSect += pi->SectsPerCylinder;// Move up
                        if (ulStartSect >= pi->StartSect)    // no change
                        {
                                goto no_change;
                        }
                }
        }
        else    // moving up/right
        {
                ulLimit = pi->StartSect + mi.ulFreeAfter;
                ulStartSect = pqRoundPos(
                            pi->SectsFirstCylinder,
                            pi->SectsPerCylinder,
                            ulStartSect,
                            RS_UP );
                while (ulStartSect > ulLimit) // While too high
                {
                        ulStartSect -= pi->SectsPerCylinder;// Move down
                        if (ulStartSect <= pi->StartSect)    // no change
                                goto no_change;
                }
                Check to see if moving above bootable limit
                (1024th cylinder)
        } // end else moving up
        Adjust ulStartSect if there is not room to move it where
        specified, but remember Extended is handled differently.
        Open the partition and lock it for exclusive access.
        // Move the partition
        if (pi->FSType == FS_EXTEND)          // if extended partition
        {
                pqRet = MoveExtended( pi, ulStartSect, ME_SHOW_PROGRESS );
                ulQuarantine = LL_SAFE_AFTER; // don't quarantine any drives
        }
        else if (pi->Flags & PI_EXTEND)       // if logical
                pqRet = MoveLogical( pi, ulStartSect, &eUpdateParts,
ulOpFlags);
        else             // if primary
                pqRet = MovePrimary( pi, ulStartSect, &eUpdateParts,
ulOpFlags);

If the operation wasn't done, do recovery and error handling,
        else    // the operation was successful
        {
                if (pi->FSType == FS_NOFORMAT)       // if NOT formatted
                        pqRet = UpdateUnformatted(pi);// Update partition type
                Adjust system structures for new starting sector
        }
        Unlock and close the partition.
        return pqRet;
} // end pqMove()

static PQRET MoveExtended(
            PARTITION_INFO *piExtend,         // Partition to act upon
            ULONG ulStartSect,                // New starting sector
            ULONG ulFlags)                    // MoveExtended flags
{
```

```
            PQRET pqRet = PQ_OK;      // return status
            PQRET pqRet2;             // errors during cleanup
            PARTITION_INFO *piTemp;   // temporary pointer
            int iNeedPi=0;            // flag - need to create pi for 1st EPBR
  5         ULONG ulEndSect;          // ending sector of extended (plus one)
            ULONG ulHasFree;          // Does the chain have free blocks?

Check the bounds and make sure the move is legal.
            for example, does it totally delete the extended partition?
 10         ulFlags = ulFlags;
            ulHasFree = piExtend->di->Flags & DI_HASFREE;// free blocks?
            Update the chain used internally to represent partitions.
            // calculate last sector
            ulEndSect = piExtend->StartSect + piExtend->NumSects;
 15         Write pqflex sector
            Change file system type to PQFLEX
            Update internal representations of partitions.
            Change MBR for new size.
            Update all EPBR's for the new base.
 20         Restore partition type.
            If necessary create a PI structure for the 1st EPBR.
            Handle any errors.
            return pqRet;
        } // end MoveExtended()
 25
        // Assume: ulStartSect is different than pi->StartSect.
        // Assume: All partitions end on a cylinder boundary.

static PQRET MoveLogical(           // Move a logical drive
 30                 PARTITION_INFO *pi,     // Partition to act upon
                    ULONG ulStartSect,      // New starting sector
                    COMPLETION_STATE *peUpdateParts,   // do afterwards
                    ULONG ulOpFlags)
        {
 35         PQRET pqRet = PQ_OK;
            PARTITION_INFO *piClone = NULL;    // for higher StartSect
            ULONG ulEncloseSize;    // Size necessary to enclose old & new
            ULONG ulOldStartSect=pi->StartSect; // Old starting sector
            ULONG ulEpbrSect;               // EPBR will be moved to here
 40         PARTITION_INFO *piExtend;       // The extended partition
            PARTITION_INFO *piTmp;          // Misc, temporary pi pointer
            PQRET pqRet2;                   // 2nd return value
            PQRET pqWarn = PQ_OK;
            PQRET pqWarn2;
 45         ULONG ulFlags=0L; // Keep track of recovery procedures necessary:
            const ULONG RESTORE_TYPE =   Restore original partition type
            const ULONG RESTORE_POS =    Restore original partition position
            const ULONG RESTORE_SIZE =   Restore original partition size
            const ULONG RESTORE_1ST_FREE =
 50             Restore PI for EPBR for free space at start of extended
            const ULONG RESTORE_PI_POS = Restore pi->StartSect, pi->NumSects Check the bounds and make sure the move is legal.
            Run a Check before the move.
 55         Test ulEpbrSect and make sure the sector is not bad.
            Make a copy of the pi structure.
            Change partition to enclose both old and new positions.
            Then move the data.
            If move forces resize left boundary of extended partition,
 60         do so.
            If beyond extended boundary
```

```
        {
                Move start of extended. (This must be done before
                MoveLogical writes its PQFLEX sector, because
                MoveExtended will write a PQFLEX sector of its own,
                possibly overwriting MoveLogical's.)
                pqRet = MoveExtended(piExtend,ulEpbrSect, 0);
                if (pqRet)
                        goto Exit;
        }
        If free space at start of extended is totally consumed,
        delete the pi.
        Write PQFLEX sector.
        From this point on, we need to roll back or complete the
        partition table changes.
        MoveVolume() will change the value as appropriate.
        Change file system type to PQFLEX.
        Update the partition tables to enclose old & new areas.
        pqRet = pqMovePartition(pi,ulStartSect,ulEncloseSize);
        If an error occurs, it means we probably can't update the
        EPBR.  By virtue of RESTORE_POS, we'll attempt to restore the
        partition table chain the way it was.
        At this point, pi/piClone are set up as follows:
        pi points to the lower address, the destination, and its
        NumSects encloses both areas.
        piClone points to the higher address, the source, and has
        the old NumSects.
        // Move the data over
        pqRet = MoveVolume(pi, piClone, peUpdateParts, ulOpFlags);
        If failure, if we're supposed to roll back, Assume that no
        writes were made anywhere by MoveVolume().  If this is not
        the case, we will have to restore the original EPBR and
        possibly an EPBR for free space at the start of the extended
        partition.
        If FAIL_UNSTABLE don't bother restoring position.
        Go ahead and restore the partition type - maybe CHKDSK can
        salvage something. At very least, FDISK can delete it.
        Update EPBR with logical's true size and position.
        Change the partition table.
        If an error occurs, we're in big trouble.
        Change the File System back to its true type.
        Check the integrity of the file system.
        If errors made it necessary, undo some of the changes.
        If we allocated a copy of pi deallocate it.
        return pqRet ? pqRet : pqWarn;
} // end MoveLogical()

static PQRET MovePrimary(
        PARTITION_INFO *pi,       // Partition to act upon
        ULONG ulStartSect,        // New starting sector
        // What do we do with partition afterwards
        COMPLETION_STATE *peUpdateParts,
        ULONG ulOpFlags)
{
        PQRET pqRet = PQ_OK;
        PARTITION_INFO *piHigh = NULL;// clone of pi for higher StartSect
        ULONG ulFlags=0L;         // Flags for error recovery
        #define MP_RESTORE_FREE 0x00000001  // Need to restore free blocks
        PQRET pqRet2;             // 2nd return value
        PARTITION_INFO *piTemp;   // return value from pqFindPart
        PROGRESS *progress = NULL;
```

```
          NEW(progress, PROGRESS);
          progress->SetRange(0, 4);     // Set progress range for pre-check error->BeginPreCheck();
 5        pqRet = Check(pi);
          IF_PQRET;                     // Run a Check before the move progress->SetRange(5, 95);    // Set progress range for move 10        Check the bounds and make sure the move is legal.

// If error now, don't do anything special to partitions
          *peUpdateParts=COMPLETE;

15        // partition is moving over free space in extended partition?

piTemp = pqFindPart(    // Find a partition/sector intersection
                    pi->di->piExtend, // Start looking with this partition
                    ulStartSect,      // start of sector range
20                  ulStartSect + pi->NumSects - 1,    // end of range
                    FP_EXTEND );      // Does pi and extended intersect?

If it overlaps, resize the extended partition, as necessary.
          pqRet = pqClonePi(pi,&piHigh);
25        if (pqRet)
                return pqRet;

vRemoveFree( pi->di );  // remove free blocks from this chain
          ulFlags |= MP_RESTORE_FREE;   // We'll need to restore them later
30
          Write PQFLEX sector.

// From this point on, we need to roll back or complete the
          // partition table changes.
35        // MoveVolume() will change the value as appropriate.
          *peUpdateParts = FAIL_ROLLBACK;

Change file system type to PQFLEX.
          IF_PQRET;
40
          // Change partition to enclose both old and new positions.
          // Then move the data.
          if (ulStartSect < pi->StartSect)    // if moving lower
          {
45              pqRet = pqUpdatePt(    // Update the partition table entry
                            pi,    // partition to update
                            ulStartSect,// new value of 1st sector
                            pi->StartSect + pi->NumSects );// same end
                IF_PQRET;
50
                piTemp = pi;
                pqRet = MoveVolume(    // move the data over
                            pi,    // to this partition
                            piHigh,    // from this partition
55              // What do we do with the partition after moving the data
                            peUpdateParts, ulOpFlags);
                IF_PQRET;
          }
          else   // if moving higher
60        {
                pqRet = pqUpdatePt(    // Update the partition table entry
```

40

```
                                piHigh,         // partition to update
                                pi->StartSect,    // start remains same
                                ulStartSect + pi->NumSects );  // new end
                IF_PQRET;
 5              // Changing PARTITION_INFO members outside pqlib.cpp
                // can have unexpected side effects.
                // For DOS and OS/2, we change StartSect and
                // NumSects and clean up later:
                // let the low pi enclose entire space
10              pi->NumSects = piHigh->NumSects;
                piHigh->StartSect = ulStartSect;
                piHigh->NumSects = pi->ulXNumSects;

// Move the data over
15              piTemp = piHigh;
                pqRet = MoveVolume(            // move the data over
                                piHigh,        // to this partition
                                pi,            // from this partition
                                peUpdateParts, ulOpFlags);
20              IF_PQRET;
        }

// At this point, pi/piHigh are set up as follows:
        // pi points to the lowest address and its NumSects encloses both
25      // areas
        // piHigh points to the highest address and has the old NumSects
        // Update MBR to final size.
        // (assumed that if pqRet == 0, then *peUpdateParts == COMPLETED.)

30      Update the partition table entry.
        Change the File System back to its true type.
        Run a Check after the move.
Exit:
        delete progress;
35      if (*peUpdateParts == FAIL_ROLLBACK)
        // if we need to change back partition
        {
                pqRet2 = pqUpdatePt(     // Update the partition table entry
                                pi,      // partition to update
40                              pi->ulXStartSect, // old value 1st sector
                                pi->ulXStartSect + pi->ulXNumSects );
                                // old value of last sector + 1
                if (!pqRet)      // if no previous error
                        pqRet = pqRet2;    // remember this one
45              pqRet2 = pqChangePartType(     // to original file system
                                pi,            // change this partition
                                pi->ucXPartType,  // orig partition type
                                pi->ucXFSType );  // orig file system type
                if (!pqRet)                // if no previous error
50                      pqRet = pqRet2;    // remember this one
        }
        if (piHigh)        // if we allocated a copy of pi
                pqFreeClone( &piHigh );  // deallocate it
        if (ulFlags & MP_RESTORE_FREE)// If we need to restore free blocks
55      {
                pqRet2 = pqAddFree( pi->di );
        // add free blocks back to this chain
                if (!pqRet)             // if no previous error
                        pqRet = pqRet2;    // remember this one
60      }
        return pqRet;
```

```
        } // end MovePrimary()

// Does not require move/copy to be on same drive
        // File system specific tasks are handled by callouts through
 5      // virtual functions.
        // One embodiment of the sector replicator 88 includes MoveVolume().
        PQRET MoveVolume(
                    PARTITION_INFO *piDest,  // pointer to destination partition
                    PARTITION_INFO *piSrc,   // pointer to source partition
10                  COMPLETION_STATE *eState, // reports completion state
                    ULONG ulFlags,           // bad sector flags
                    ULONG ulMoveCopy)        // are we called from move or copy
        {
            PQRET pqRet = 0;
15          VOLUME_BASE *pVol = NULL;    // pointer hides file system
            STATE_MAP *pBitMap = NULL;   // bitmap for moving blocks
            PROGRESS *progress = NULL;   // dummy progress
            PROGRESS *moveProgress = NULL;// move progress
            BAD_SECT_LIST *bsl = NULL;   // bad sector list new location
20          UCHAR *pucReadWriteBuf = NULL;// buffer for block reads and writes
            UCHAR *pucReadWritePos;      // position next read/write in buff
            ULONG ulMoveFlags = 0;       // move flags
            ULONG ulSectsPerBlock;       // size in sectors of each block
            ULONG ulBytesPerBlock;       // size in bytes of each block
25          ULONG ulTotalBlocks;         // total # of blocks in partition
            ULONG ulTotalBlocksInBuffer; // # blocks in read/write buffer
            ULONG ulCurWindow;           // begin block of operation
            ULONG ulBeginRun;   // beg'g bitmap pos'n read/write operations
            ULONG ulEndRun;     // end bitmap position for read/write operations
30          ULONG ulRunSize;    // # of blocks in current read/write operation
            ULONG ulLoop;
            ULONG ulNewStart;            // target start physical sector
            ULONG ulNewEnd;              // target end physical sector
            ULONG ulBlocksToMove;        // returns # of blocks in window
35          ULONG ulMoveSects;       // total move operations (for progress)
            ULONG ulCurMoveSect = 0;// current # move ops (for progress)
            ULONG ulBlocksLeft;      // returns # of blocks found in window
            enum {READ_PASS, WRITE_PASS, DONE} pass;
            LOGHAND lhDest=PQILLHAND;        // Destination handle
40          LOGHAND lhSrc=PQILLHAND;         // Source handle
            *eState = FAIL_ROLLBACK;         // setup for any failure
            NEW(progress, PROGRESS);
            pqRet = pqLogOpen(               // Open the destination partition
                        piDest,  // The destination partition
45                      &lhDest); // Returns handle here.
            IF_PQRET;
            pqRet = pqLogOpen(               // Open the source partition
                        piSrc,   // The source partition
                        &lhSrc); // Returns handle here.
50          IF_PQRET;
            pqRet = MountVolume(             // mount (and init) the volume
                        piSrc,   // pointer to the source partition
                        &ulMoveFlags,
                        // allow MountVolume to flag the volume DUMB
55                      &pVol);
            // returns pointer to specific volume, masks it in a VOLUME_BASE *
            IF_PQRET;
            // references to pVol are restricted to base class references
            ulNewStart = piDest->StartSect;
60          // find new area and direction of the move
            ulNewEnd = piDest->StartSect + piSrc->ulXNumSects - 1;
```

```
        if (ulMoveCopy & MOVE_COPY)
        // if we're doing a copy (behaves same as move down)
        {
                ulMoveFlags |= MOVE_DOWN;
                ulMoveFlags &= ~MOVE_OVERLAPS;
        }
        else if(piDest->StartSect < piSrc->StartSect)
        {                                                       // if moving down
                ulMoveFlags |= MOVE_DOWN;
                if ((ulNewStart + piSrc->ulXNumSects) > piSrc->StartSect)
                        ulMoveFlags |= MOVE_OVERLAPS;
        } else                                                  // if moving up
        {
                ulMoveFlags |= MOVE_UP;
                if (piSrc->StartSect + piSrc->ulXNumSects > ulNewStart)
                {
                        ulMoveFlags |= MOVE_OVERLAPS;
                }
        }
        if (piSrc->FSType == FS_NOFORMAT)   // setup progress variable
                ulMoveSects = 2;
        // count once for sects read, once for sects written
        else if (ulMoveFlags & MOVE_DUMB)
                ulMoveSects = piSrc->ulXNumSects * 2;
        else
                ulMoveSects = piSrc->UsedSects * 2;
        NEW(bsl, BAD_SECT_LIST);
        if ((ulFlags & PREF_BS_TEST) || (ulMoveFlags & MOVE_DUMB))
                Do bad sector test
                If NOT formatted, test boot sector only.
                If it's a dumb move (doesn't work around bad sectors)
                and bad sector test is off, we will test anyway.
                If it's a dumb move quit testing after 1 found, otherwise
                find all bad sectors.
                // set the progress (report to user thru GUI) range for move
                progress->SetRange((ulTestSects*100) /
(ulTestSects+ulMoveSects), 100);
        }

NEW(pBitMap, STATE_MAP);// bitmap for moving blocks (1 bit/block)
        pqRet = pVol->BeginMove(// file system specific initialization
                        pBitMap,
                // on return, bitmap contains used blocks (none bad)
                        bsl,
                        piDest,
                        &ulSectsPerBlock,
                // returns size (in sectors) of each block
                        &ulTotalBlocks);
                // returns number of blocks in volume
        IF_PQRET;
        // derive block variables
        ulBytesPerBlock = ulSectsPerBlock * piSrc->BytesPerSect;
        ulTotalBlocksInBuffer = // determine how much memory to allocate
                        pqQueryCoreOpt();
        ulTotalBlocksInBuffer /=        // do allocation in blocks
                        ulBytesPerBlock;
        if (!ulTotalBlocksInBuffer)    // not enough memory for 1 block
        {
                pqRet = ERR_OUT_MEMORY;
                goto Exit;
        }
```

43

```
                if (ulTotalBlocksInBuffer > ulTotalBlocks)
                        ulTotalBlocksInBuffer =
                        // limit move by total blocks in partition
                                ulTotalBlocks;
 5              if ((ulMoveFlags & MOVE_UP) && (ulMoveFlags & MOVE_OVERLAPS))
                {
                        ulTotalBlocksInBuffer =
                        // limit moves up by move distance of move
                                min(ulTotalBlocksInBuffer, (ulNewStart - piSrc-
10      >StartSect) / ulSectsPerBlock);
                }
                NEW(pucReadWriteBuf, UCHAR[ulTotalBlocksInBuffer *
        ulBytesPerBlock]);
                NEW(moveProgress, PROGRESS(GP_ALLOWCANCEL));
15              if (ulMoveCopy & MOVE_COPY)     // set progress text to MOVE || COPY
                        moveProgress->SetText(PROG_COPYING_DATA);
                else
                        moveProgress->SetText(PROG_MOVING_DATA);
        #define MAX_RUN_SIZE 5000// limit to allow progress to update nicely
20              ulEndRun = 0;// init start bit for (move down or non-overlapped)
                ulCurWindow = ulTotalBlocks;
                // initialize start bit for (overlapped move up)
                while(1)    // move until we've determined there is no more
                {
25                      ulCurWindow = GetNextWindow(
                        // returns position of next read/write window
                                ulCurWindow, // position of last window processed
                                ulMoveFlags, // which direction to move window
                                pBitMap,     // pointer to the bitmap
30                              ulTotalBlocks,    // don't go beyond end of partition
                                ulTotalBlocksInBuffer,
                                // window size limited by read/write buffer
                                ulEndRun,
                                // start bit for (move down or non-overlapped)
35                              &ulBlocksToMove);
                                // returns number of blocks found in window
                        if (ulBlocksToMove == 0)        // quit if no more
                                break;

40                      // scan bitmap once, fill read buffer, scan again and write
        #pragma warning 139 10              // turn off ++enum warning
                        for(pass = READ_PASS; pass != DONE; pass++)
        #pragma warning 139 1               // turn on  ++enum warning
                        {
45                              ulEndRun = ulCurWindow;
                                pucReadWritePos = pucReadWriteBuf;
                                ulBlocksLeft = ulBlocksToMove;
                                while (ulBlocksLeft)
                                // while window not completely processed
50                              {
                                        // scan the bitmap for the first block with data
                                        ulBeginRun = pBitMap->GetNextSet(ulEndRun);
                                        // determine consecutive blocks
                                        ulEndRun = pBitMap->GetNextClear(ulBeginRun);
55                                      // if consecutive blocks go beyond partition
                                        if ((ulEndRun == -1) || (ulEndRun >
        ulTotalBlocks))
                                                ulEndRun = ulTotalBlocks;
                                        // if consecutive blocks won't fit in buffer
60                                      if (ulEndRun - ulBeginRun > ulBlocksLeft)
                                                ulEndRun = ulBeginRun + ulBlocksLeft;
```

```
                // may have to pare down the ulRunSize here if it is too large
                // for 'progress' to update nicely
                                if (ulEndRun - ulBeginRun > MAX_RUN_SIZE)
                                        ulEndRun = ulBeginRun + MAX_RUN_SIZE;
                                // calculate the run size
                                ulRunSize = ulEndRun - ulBeginRun;
                                // update progress
                                ulCurMoveSect += ulRunSize * ulSectsPerBlock;
                                pqRet = moveProgress->Update(ulCurMoveSect,
    ulMoveSects);
                                // if a CANCEL occurs and we are allowing it...
                                if(pqRet && *eState != COMPLETE)
                                        goto Exit;
                                if (pass == READ_PASS)   // pass == READ_PASS
                                {
                                        if (*eState == COMPLETE)
                // if failure would be catastrophic, ignore disk errors
                                        {
                                                ForceRead(
                                                lhSrc,   // partition
                                                (void *)pucReadWritePos,// buffer
                                                ulBeginRun * ulSectsPerBlock,
                                                // begin sector
                                                ulRunSize * ulSectsPerBlock,
                                                // number of sectors to read
                                                piSrc->BytesPerSect);
                                        }
                                        else
                // else quit if read fails
                                        {
                                                pqRet = pqLogRead(
                                                    // read logical sectors
                                                    lhSrc,// partition to read
                                                    ulBeginRun * ulSectsPerBlock,
                                                    // begin sector
                                                    (void *)pucReadWritePos,
                                                    // sector buffer
                                                    ulRunSize * ulSectsPerBlock);
                                                    // number of sectors to read
                                                IF_PQRET;
                                        }
                                }
                                else   // pass == WRITE_PASS
                                {
                                        if ((*eState != COMPLETE)       &&
    // if (user cancel OK)
                                                (ulMoveFlags & MOVE_OVERLAPS) &&
                                                (((ulMoveFlags & MOVE_DOWN) &&
                // and move down will overwrite the source
                                                (piSrc->StartSect <= piDest-
    >StartSect + ulEndRun * ulSectsPerBlock)) ||
                                                ((ulMoveFlags & MOVE_UP)       &&
    // or move up will overwrite the source
                                                (piSrc->StartSect + piSrc->ulXNumSects
    > piDest->StartSect + ulBeginRun * ulSectsPerBlock))))
                                        {
                                                pqRet = moveProgress-
    >DisableCancel();
                                                IF_PQRET;
                                                *eState = COMPLETE;
                // flag user cancel 'not OK'
```

```
                                }
                                if (*eState == COMPLETE)
                // if failure would be catastrophic, ignore
                                {
                                        ForceWrite(
                                                lhDest,
                                                (void *)pucReadWritePos,
                                                ulBeginRun * ulSectsPerBlock,
                                                ulRunSize * ulSectsPerBlock,
                                                piSrc->BytesPerSect);
                                }
                                else
                // else quit if write fails
                                {
                                        pqRet = pqLogWrite(
                                                // write logical sectors
                                                lhDest,
                                                ulBeginRun * ulSectsPerBlock,
                                                (void *)pucReadWritePos,
                                                ulRunSize * ulSectsPerBlock);
                                        IF_PQRET;
                                }
                        }
                        ulBlocksLeft -= ulRunSize;
                        // done processing this run
                        pucReadWritePos += ulRunSize * ulSectsPerBlock *
piSrc->BytesPerSect;
                }
        }
        // file system specific cleanup
        pqRet = pVol->EndMove(bsl, piDest, lhDest);
        IF_PQRET;
        pqRet = pVol->UpdateHiddenSects(piDest, piSrc->FSType, lhDest);
        IF_PQRET;
        *eState = COMPLETE;
        pqRet = moveProgress->Done();

if (MOVE_DUMB && (piSrc->DriveLetter != PI_NODL))
                pqSetRebootFlag();

Exit:
        if (lhDest != PQILLHAND)                   // if handle was opened
                pqLogClose( lhDest );              // close it
        if (lhSrc != PQILLHAND)                    // if handle was opened
                pqLogClose( lhSrc );               // close it
        delete pBitMap;
        delete bsl;
        delete pVol;
        delete moveProgress;
        // delete progress objects in reverse order of creation
        delete progress;
        delete pucReadWriteBuf;
        return pqRet;
} // end MoveVolume()

// The window is determined from the bitmap and is limited by the
// number of blocks in the read/write buffer.
// One embodiment of the window sizer 86 includes GetNextWindow().
static ULONG GetNextWindow(    // returns first block in window
        ULONG ulLastWindow,    // start of last window
```

```
        ULONG ulMoveFlags,      // which direction to move window
        STATE_MAP *pBitMap,     // pointer to the bitmap
        ULONG ulTotalBlocks,    // don't go beyond end of partition
        ULONG ulBlocksInBuffer, // window limited by read/write buffer
5       ULONG ulStart           ,
        // start bit for (move down or non-overlapped)
        ULONG *ulBlocksToMove)  // returns # of blocks found in window
{
        ULONG ulNextWindow;
10      ULONG ulEndWindow;
        // if moving down (same as moving to a new drive) or no overlap
        if ((ulMoveFlags & MOVE_DOWN) || !(ulMoveFlags & MOVE_OVERLAPS))
        {
                ulNextWindow =     // start at the next used cluster
15                      pBitMap->GetNextSet(ulStart);
                // if there is no next used cluster
                if ((ulNextWindow == (ULONG)-1)      || (ulNextWindow >=
ulTotalBlocks))
                {
20                      *ulBlocksToMove = 0;
                        return 0;          // we are done
                }
                ulEndWindow = ulTotalBlocks-1;
                // go until end of partition (or buffer full)
25      }
        else
        {
                ulEndWindow =
        // end at the used cluster immediately previous to last window
30                      pBitMap->GetPrevSet(ulLastWindow);
                if (ulEndWindow == (ULONG)-1)
                {          // if there is no previous used cluster
                        *ulBlocksToMove = 0;   // we are done
                        return 0;
35              }
                else if (ulEndWindow < ulBlocksInBuffer)
                {
                        ulNextWindow = 0; // start at beginning of partition
                }
40              else
                {       // start at the move_up fixed limit
                        ulNextWindow = ulEndWindow - ulBlocksInBuffer + 1;
                }
        }
45      *ulBlocksToMove =
                pBitMap->GetSetCount(
                        ulNextWindow,// start counting at ulNextWindow
                        ulEndWindow,// count through ulEndWindow-1
                        ulBlocksInBuffer);
50                      // don't count more than will fit in buffer
        return ulNextWindow;    // return first block in window
} // end GetNextWindow()

// MountVolume() Returns initialized pointer to a volume class,
55 // disguised as a BASE_VOLUME *
static PQRET MountVolume(
        PARTITION_INFO *p,
        ULONG *ulMoveFlags,
        VOLUME_BASE **pVol)
60 {
        PQRET pqRet = 0;
```

```
                if (p->FSType == FS_NOFORMAT)       // if UNFORMATTED
                {
                        NEW(*pVol, VOLUME_BASE(p));
                }
    5           else if (p->FSType == FS_FAT)       // if FAT (SMART)
                {
                        NEW(*pVol, FAT_VOLUME(p));
                }
                else if (p->FSType == FS_NTFS)      // if NTFS (SEMI_SMART)
    10          {
                        NEW(*pVol, NTFS_VOLUME(p));
                }
                else                                // else UNKNOWN
                {
    15                  NEW(*pVol, VOLUME_BASE(p));
                        // this will only happen if check lets
                        *ulMoveFlags |= MOVE_DUMB;
                        // unknown partitions through (i.e., HPFS, LINUX)
                }
    20          // Initialize the Volume
                pqRet = (*pVol)->Init();
        Exit:
                if (pqRet)
                {
    25                  delete(*pVol);
                }
                return pqRet;
        } // end MountVolume()

30  static void SaveState(  // Save away some state information
                PARTITION_INFO *pi )// Partition to act upon
        {
                pi->ulXStartSect = pi->StartSect;   // starting sector
                pi->ulXNumSects = pi->NumSects;
    35          // total number of sectors in the partition
                pi->ulXPartSect = pi->PartitionSect;// partition table sector
                pi->ucXPartIndex = pi->PartitionIndex;
                // Index into partition table
                pi->ucXPartType = pi->PartType;
    40          // partition type (value from partition table)
                pi->ucXFSType = pi->FSType;   // File System Type
                return;
        } // end SaveState()
```

In summary, the present invention provides a novel system and method for implementing partition manipulation tools. Generic interfaces allow the use of a single data replicator 72 with multiple file-system-specific modules 76, 80, 84. This makes it possible to decrease costs, improve reliability, broaden applicability and otherwise enhance partition manipulation tools, including tools for moving and/or copying partitions, while supporting efficient, correct, and safe partition manipulations.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform partition tool implementation steps and/or provide separation between file-system-dependent and file-system-independent components of a partition manipulation tool substantially as described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector, the initialization interface further including a result generated in response to events which include success, memory allocation errors, and disk access errors;

an initialization module which is capable of generating the sector identifications and otherwise interfacing with the data replicator through the initialization interface; and a partition table utilizer for accessing the partition table and maintaining the integrity and self-consistency of the partition table in connection with data replication.

2. The system of claim 1, wherein the data replicator, initialization module, and partition table utilizer in combination provide a means for copying a partition to a different location on the partitionable storage medium.

3. The system of claim 1, wherein the data replicator, initialization module, and partition table utilizer in combination provide a means for moving a partition to a different location on the partitionable storage medium.

4. The system of claim 1, wherein the data replicator, initialization module, and partition table utilizer in combination provide a means for replicating a partition from one disk to another disk in the partitionable storage medium.

5. The system of claim 1, wherein the initialization interface source sector identification includes a file allocation unit bitmap.

6. The system of claim 1, wherein the initialization interface source sector identification includes a file allocation unit runmap.

7. The system of claim 1, wherein the initialization interface source sector identification identifies all sectors in the selected partition.

8. The system of claim 1, wherein the initialization interface further includes an indication of the number of sectors in a file system allocation unit used by the initialization module file system.

9. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the initialization module avoids bad sectors by omitting sectors from at least one of the initialization interface sector identifications.

10. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the initialization interface further includes a bad sector identification.

11. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the initialization module is specific to at least one file system of the computer system and includes a means for relocating user data to avoid colliding with a bad sector during replication.

12. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the data replicator also has a verification interface for interfacing to any of a plurality of verification modules according to a format which is substantially independent of the file systems, and the system further comprises a verification module which is specific to at least one file system, which is capable of verifying the integrity and self-consistency of system structures used by the at least one file system, and which is capable of interfacing with the data replicator through the verification interface.

13. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the data replicator also has a completion interface for interfacing to any of a plurality of completion modules according to a format which is substantially independent of the file systems, and the system further comprises a completion module which is capable of interfacing with the data replicator through the completion interface.

14. The system of claim 13, wherein the completion module is specific to at least one file system of the computer system and is capable of updating system structures used by the at least one file system to avoid bad sectors.

15. A computer system implementing a partition manipulation architecture capable of supporting multiple file systems on a computer, the computer having a processor for executing instructions, a memory for storing instructions, and a partitionable storage medium for holding data in sectors according to a partition table, the memory and the partitionable storage medium being accessible by execution of processor instructions, the computer system comprising:

a data replicator for replicating data from a source sector in a selected partition to a destination sector in a modified partition in the partitionable storage medium, the data replicator having an initialization interface for interfacing to any of a plurality of initialization modules according to a format which is substantially independent of each file system of the computer system, the initialization interface including a source sector identification identifying the source sector;

an initialization module which is capable of generating the sector identifications and otherwise interfacing with the data replicator through the initialization interface; and a partition table utilizer for accessing the partition table and maintaining the integrity and self-consistency of the partition table in connection with data replication;

wherein the data replicator utilizes an area of memory to temporarily store data during replication, and the size of the memory area depends at least on the extent of any overlap between the selected partition and the modified partition, the amount of available memory, and the size of the selected partition.

16. A computer system comprising:

a computer having a processor, a memory, and a partitionable storage medium for holding data in sectors according to a partition table;

data replication means for replicating data from source sectors in a selected partition to destination sectors in a modified partition in the partitionable storage medium, the data replication means comprising a window sizing means for determining the maximum number of sectors to be buffered together in volatile memory;

file-system-specific initialization module means for generating a source sector identification; and initialization interface means for interfacing the data replication means with the initialization module means in a file-system-independent format.

17. The system of claim 16, further comprising means for reading and writing a partition table.

18. A computer system comprising:

a computer having a processor, a memory, and a partitionable storage medium for holding data in sectors according to a partition table;

data replication means for replicating data from source sectors in a selected partition to destination sectors in a modified partition in the partitionable storage medium;

file-system-specific initialization module means for generating a source sector identification;

initialization interface means for interfacing the data replication means with the initialization module means in a file-system-independent format;

verification module means for processing a request to verify the integrity and self-consistency of file system structures; and verification interface means for interfacing the data replication means with the verification module means in a file-system-independent format.

19. A computer system comprising:

a computer having a processor, a memory, and a partitionable storage medium for holding data in sectors according to a partition table;

data replication means for replicating data from source sectors in a selected partition to destination sectors in a modified partition in the partitionable storage medium;

file-system-specific initialization module means for generating a source sector identification;

initialization interface means for interfacing the data replication means with the initialization module means in a file-system-independent format;

completion module means for processing a request to update system structures; and completion interface means for interfacing the data replication means with the completion module means in a file-system-independent format.

20. A computer system comprising:

a computer having a processor, a memory, and a partitionable storage medium for holding data in sectors according to a partition table;

data replication means for replicating data from source sectors in a selected partition to destination sectors in a modified partition in the partitionable storage medium;

file-system-specific initialization module means for generating a source sector identification;

initialization interface means for interfacing the data replication means with the initialization module means in a file-system-independent format; and a means for identifying bad sectors in the modified partition;

wherein a bad sector is located at a relative position within the modified partition, a user data or file system structure sector is located at a relative position within the selected partition, and the system further comprises a means for determining whether the relative position of the bad sector and the relative position of the user data or file system structure sector intersect.

21. The system of claim 20, further comprising a means for relocating the user data or file system structure sector so that the relative position of the bad sector and the relative position of the user data or file system structure sector do not intersect.

22. A method for providing a partition manipulation tool, comprising the computer-assisted steps of:

providing a data replicator for replicating data from source sectors in a selected partition to destination sectors in a modified partition in a partitionable storage medium, the data replicator having a window sizer which determines the maximum number of sectors to be buffered together in volatile memory;

providing an initialization module for generating a source sector identification; and interfacing the data replicator with the initialization module in a file-system-independent format.

23. The method of claim 22, wherein the step of providing an initialization module includes providing a file-system-specific initialization module.

24. The method of claim 22, further comprising the computer-assisted step of providing means for reading and writing a partition table.

25. The method of claim 22, further comprising the computer-assisted step of using the interfaced data replicator and initialization module to produce a modified partition by replicating a selected partition.

26. The method of claim 25, wherein the modified partition and the selected partition reside on the same disk drive.

27. The method of claim 25, wherein the modified partition and the selected partition reside on different disk drives which are attached to the same computer.

28. A method for providing a partition manipulation tool, comprising the computer-assisted steps of:

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format;

providing a file-system-specific verification module for verifying the integrity and self-consistency of file system structures; and interfacing the data replicator with the verification module in a file-system-independent format.

29. A method for providing a partition manipulation tool, comprising the computer-assisted steps of:

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format;

providing a file-system-specific completion module for updating file system structures used to avoid bad sectors; and interfacing the data replicator with the completion module in a file-system-independent format.

30. A method for providing a partition manipulation tool, comprising the computer-assisted steps of:

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format;

using the interfaced data replicator and initialization module to produce a modified partition by replicating a selected partition;

wherein the modified partition and the selected partition reside on different disk drives which are attached to two different computers.

31. The method of claim 30, further comprising the computer-assisted step of creating an intermediate file on a server computer which is connected by a network to the two different computers.

32. The method of claim 30, further comprising the computer-assisted step of creating an intermediate file on a computer-readable storage medium.

33. A computer storage medium having a configuration that represents data and instructions which will cause at least a portion of a computer system to perform method steps for providing a partition manipulation tool, the method steps comprising:

providing a data replicator for replicating data from source sectors in a selected partition to destination sectors in a modified partition in a partitionable storage medium, the data replicator having a window sizer;

providing an initialization module for generating a source sector identification; and interfacing the data replicator with the initialization module in a file-system-independent format.

34. A computer storage medium having a configuration that represents data and instructions which will cause at least a portion of a computer system to perform method steps for providing a partition manipulation tool, the method steps comprising:

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format;

providing a file-system-specific verification module for verifying the integrity and self-consistency of file system structures; and interfacing the data replicator with the verification module in a file-system-independent format.

35. The computer storage medium of claim 34, wherein the step of providing an initialization module includes providing a file-system-specific initialization module.

36. The computer storage medium of claim 34, wherein the step of providing a data replicator includes providing a window sizer.

37. The computer storage medium of claim 34, wherein the method further comprises the computer-assisted step of providing means for reading and writing a partition table.

38. The computer storage medium of claim 34, wherein the method further comprises the steps of:

providing a file-system-specific completion module for updating file system structures used to avoid bad sectors; and interfacing the data replicator with the completion module in a file-system-independent format.

39. The computer storage medium of claim 34, wherein the method further comprises the computer-assisted step of using the interfaced data replicator and initialization module to produce a modified partition by replicating a selected partition.

40. The computer storage medium of claim 39, wherein the modified partition and the selected partition reside on the same disk drive.

41. The computer storage medium of claim 39, wherein the modified partition and the selected partition reside on different disk drives which are attached to the same computer.

42. The computer storage medium of claim 39, wherein the modified partition and the selected partition reside on different disk drives which are attached to two different computers.

43. The computer storage medium of claim 42, wherein the method further comprises the computer-assisted step of creating an intermediate file on a server computer which is connected by a network to the two different computers.

44. The computer storage medium of claim 42, wherein the method further comprises the computer-assisted step of creating an intermediate file on a computer-readable storage medium.

45. A computer storage medium having a configuration that represents data and instructions which will cause at least a portion of a computer system to perform method steps for providing a partition manipulation tool, the method steps comprising:

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format;

providing a file-system-specific completion module for updating file system structures used to avoid bad sectors; and interfacing the data replicator with the completion module in a file-system-independent format.

46. A computer storage medium having a configuration that represents data and instructions which will cause at least a portion of a computer system to perform method steps for providing a partition manipulation tool, the method steps comprising;

providing a data replicator for replicating data from source sectors in a selected partition to destination sectors in a modified partition in a partitionable storage medium;

providing an initialization module for generating a source sector identification;

interfacing the data replicator with the initialization module in a file-system-independent format; and using the interfaced data replicator and initialization module to produce a modified partition by replicating a selected partition;

wherein the modified partition and the selected partition reside on different disk drives which are attached to two different computers.

* * * * *